(12) United States Patent
Kobylarz

(10) Patent No.: US 8,369,841 B2
(45) Date of Patent: Feb. 5, 2013

(54) INVOKE FACILITY SERVICE AND ITS APPLICATIONS TO COMPOUND WIRELESS MOBILE COMMUNICATION SERVICES

(76) Inventor: Thaddeus John Kobylarz, Morristown, NJ (US)

( * ) Notice: Subject to any disclaimer, the term of this patent is extended or adjusted under 35 U.S.C. 154(b) by 81 days.

(21) Appl. No.: 12/931,172

(22) Filed: Jan. 27, 2011

(65) Prior Publication Data

US 2011/0201318 A1 Aug. 18, 2011

Related U.S. Application Data

(60) Provisional application No. 61/338,080, filed on Feb. 16, 2010.

(51) Int. Cl.
*H04M 3/42* (2006.01)
(52) U.S. Cl. ............... 455/414.1; 455/418; 455/419; 455/420; 455/466; 455/550.1; 455/556.2; 379/93.23; 379/93.24; 705/39
(58) Field of Classification Search .......... 455/414.1, 455/418–420, 466, 550.1, 556.2; 379/93.23, 379/93.24; 705/39
See application file for complete search history.

(56) References Cited

U.S. PATENT DOCUMENTS

| | | | | |
|---|---|---|---|---|
| 7,076,255 B2 * | 7/2006 | Parupudi et al. | ........... | 455/456.1 |
| 7,376,909 B1 * | 5/2008 | Coyle | ............ | 715/778 |
| 7,908,211 B1 * | 3/2011 | Chen et al. | ....... | 705/39 |

* cited by examiner

*Primary Examiner* — Steve D Agosta

(57) ABSTRACT

Invented is a facility service to be used as a component service for building compound wireless mobile communication services (CWSs). The name ascribed to this facility service is Invoke. The purpose of Invoke is to detect the events signifying that the CWS operation is to commence and then initiate (or invoke) the CWS execution. The events represent variables within a Boolean expression parameter of an Invoke service. The Boolean expression allows Invoke to be very versatile with respect to the possible combination of events for CWS invocation. Versatility is enhanced by the wide variety of events that are recognized; e.g., entering a geographical location, recognizing an audio signal, reaching a time of day, observing a specific caller ID. The Invoke facility service contains other parameters useful at CWS invocation; e.g., CWS password protection, CWS initialization of constants and variables, linkage to other CWSs to acquire data.

8 Claims, 15 Drawing Sheets

INVOKE FACILITY SERVICE AND ITS APPLICATIONS TO COMPOUND WIRELESS MOBILE COMMUNICATION SERVICES

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER LISTING COMPACT DISC APPENDIX

Not Applicable.

BACKGROUND OF THE INVENTION

This invention is an extension to the invention entitled "Compound wireless mobile communication services", U.S. Pat. No. 7,424,292 and the U.S. Provisional Application for Patent 60/454,412 entitled "Creation of compound wireless mobile services from fundamental wireless services". Also, the basis of this patent application is the U.S. Provisional Application for Patent 61/338,080 filed Feb. 16, 2010 which has the same title as this application, namely "The Invoke facility service and its applications to compound wireless mobile communication services".

In the U.S. Pat. No. 7,424,292 and the U.S. Provisional Application for Patent 60/454,412, Kobylarz teaches the concept, processes, and methods to graphically combine, by means of an interactive graphical compiler, an assortment of individually available and executable wireless mobile communication services for the purpose of achieving a desired objective(s). Once combined, these individual services represent an executable sequence that can be appropriately stored in the memory of a communications terminal for future invocations by a user/subscriber. That is, a single invocation of the built service combination will execute the sequence of services whenever desired by a user/subscriber.

A combined wireless mobile communication service is identified as a compound wireless mobile communication service (abbreviated CWS for the diminutive identification Compound Wireless Service). The generic identifier of the services being combined is "component service" (CS). A CS can be one of three service types: a facility service, another CWS (recursive property), or a fundamental wireless mobile communication service (FWS). The distinction among the three service types is that: (1) facility services are not in themselves wireless mobile communication services, but essential for properly executing a compound wireless mobile communication service (e.g., invoke the execution of a CWS, determine if equality exists between two parameter values), (2) a CWS may have within it components that are themselves CWSs, and (3) a FWS represent the basic kernels upon which a CWS is formed (e.g., dial a telephone number, send a text message). It is possible to decompose a CWS into its components. If a component is a CWS, then it too can be decomposed into finer components. This successive decomposition terminates when only facility services and FWS exist.

The patent also invented an interactive graphical compiler to "compile a compound wireless mobile communication service for a wireless mobile terminal" and the compiled CWS is executed within the wireless mobile terminal upon invocation. Either a wireless mobile terminal or a computer is used to build compound wireless mobile communication services. Because of its greater computational power, the building facilities are much more extensive with a computer. Consequently, a wireless mobile terminal is used to build less complex compound wireless mobile communication services or to modify those built on a computer. When a CWS is built and compiled on a computer, the compiled CWS must be down-loaded to the wireless mobile terminal.

The above work on wireless communication services had its origin in the year 2003. Of late, much interest and progress has been made in the area of wireless communication services. A disparity of nomenclature exists between this latter work and that described in the aforementioned patents. Although this invention will preserve the original nomenclature, an association needs to be made. The term wireless mobile terminal is today known as a "smartphone". Compound wireless services (CWSs) are intended to provide service capabilities on smartphones, as are today's "apps". However, there exist important distinctions between a CWS and an app. A notable distinction is the manner in which the two are built. An app is built in the traditional way of textual line coding using a higher level language. The higher level code is afterwards translated by a compiler into a machine language which a computer understands and a smartphone can execute. A CWS is built graphically, using an interactive compiler that conducts dialog with the CWS builder. The CWS graph is translated by a graphical compiler to machine code for down-loading to a smartphone for execution. An important feature of a CWS is its recursive capability; i.e., the reuse of a CWS as a component (CS) within another CWS. It is the close association of ordinary language with the algorithms for building a CWS and the close compiler interactive relationship to the builder that avails CWS recursion. Recursion is not a natural attribute of conventional apps. Another CWS attribute is derived from the close association of ordinary language with the CWS building algorithms and the graphical build process. Building a CWS is intuitive. No formal training in computer programming is needed to build a CWS. Simplicity is not a feature when using line coding to build apps.

BRIEF SUMMARY OF THE INVENTION

This invention is the detailed operation of the facility service "Invoke". Kobylarz did not teach detailed operation of the Invoke service in U.S. Pat. No. 7,424,292 or the U.S. Provisional Application for Patent 60/454,412. Both documents introduce the Invoke service with its simplest behavior and without describing its detailed operation.

The simplest operation of Invoke is to merely originate the execution of a CWS by displaying a list of CWSs on a wireless mobile terminal, scrolling through the list to select a desired CWS, and finally depressing a terminal membrane to begin the CWS execution.

The role of Invoke is to detect the events signifying that the CWS operation is to commence. Parameters are needed to accomplish the detection of events for CWS invocation. Here to fore, Invoke was devoid of invocation parameters. A default event is applied when no parameters are shown for Invoke. One such default event is the one taught in the previous paragraph; i.e., scrolling through a CWS list displayed on a subscriber's wireless mobile terminal and then selecting a desired CWS from the list.

The inclusion of invocation parameters allows Invoke to perform many more event detection operations than the simplest one above. For instance, it can incorporate a password, be voice actuated, and respond to a remote signal. Moreover, the events can be logically combined to form complex invocation conditions. These and other Invoke operations are taught below.

DETAILED DESCRIPTION OF THE INVENTION

Figure 1:
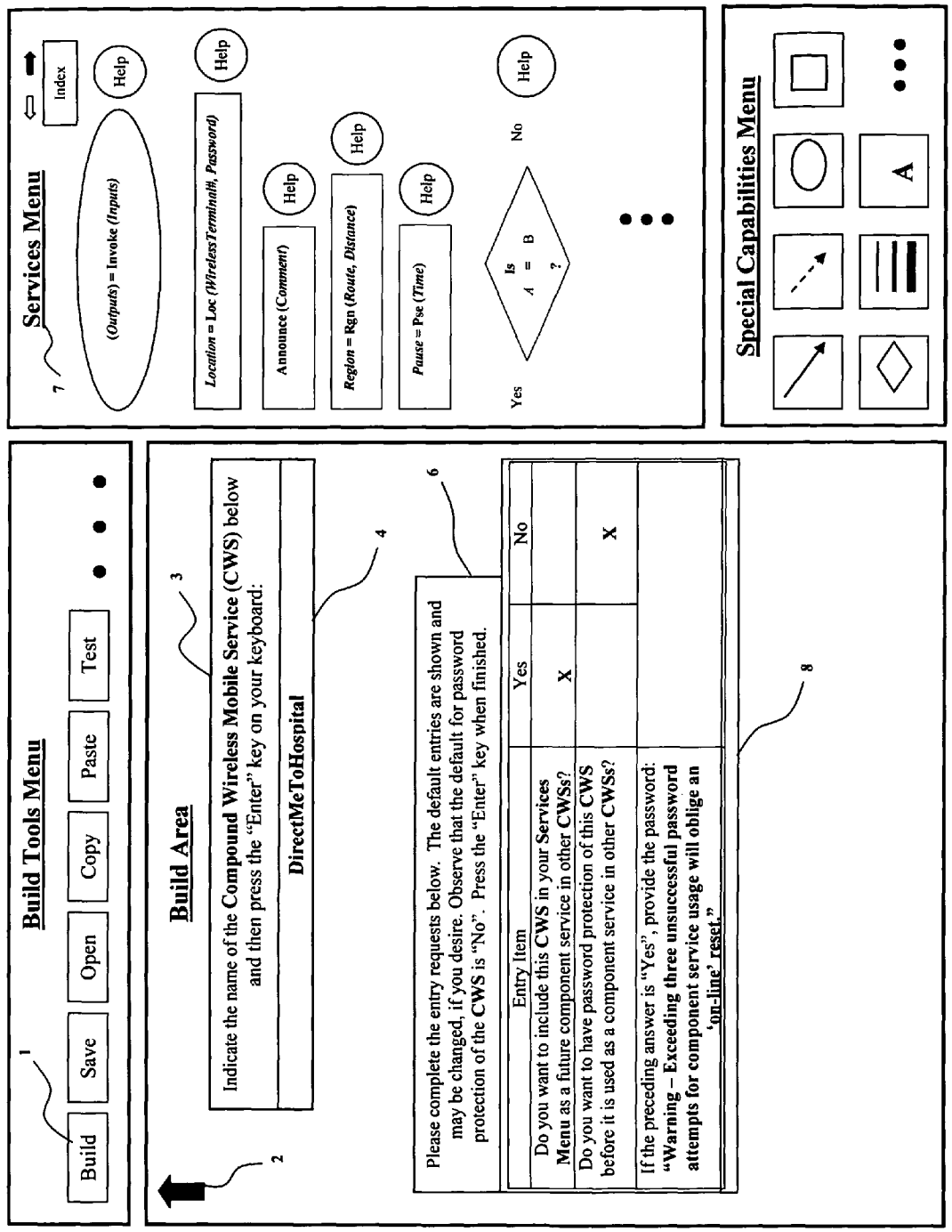
FIG. 1 shows how to start building a compound wireless mobile communication service.

A "syntactical definition" is initially provided for the invention. Knowing the syntax of a computer operation provides insight to software programmers for coding the operation. Syntax achieves this insight by using a formal grammar of words that together imply the line code commands to realize the operation. It is important to indicate that the syntactical definition does not directly represent the manner by which the Invoke facility service is built. A description on building the Invoke facility service will follow its syntactical definition.

The word "operation" appears in the preceding paragraph because the syntactical approach is generally used in software technology. For this invention, the words Component Service (abbreviated CS) will replace "operation" as a reminder of the specialized usage of syntax herein.

The syntactical approach begins by identifying the CS name (in bold upright letters); in this case it is Invoke. A brief behavioral description follows the CS name. Afterwards a syntactical relationship that relates the CS name with names for the parameters (in bold italicized letters) is presented. Parameters that influence the CS behavior are termed "independent (or input)" parameters. Parameters that are yielded by the CS are termed "dependent (or output)" parameters. Equal marks "=" separate dependent parameters (left side of "=") from the CS name and its independent parameters (right side of "="). It should be emphasized that the use of "=" is not necessarily the same as used for arithmetic or as used for a functional relationship. Generally speaking, it is intended to delineate between output parameters and input parameters, which may be of both types; i.e., a parameter may appear on both sides of "=" (or an equation). That is, a parameter name may appear as both an input and an output. This is especially important when the parameters are used beyond a CS and operations within the CS change the parameter value. As a matter of convention, all input parameters are also shown in the syntax as output parameters. Their syntactical appearance does not imply that they must be used in a CS realization. For Invoke, all output parameters are optional. The converse, of all output parameters appearing in the syntactical representation of a CS, does not necessarily exist. The meanings of the parameters are defined following the syntactical relationship.

Parameter values are described in terms of significance, types, and ranges. The term "value" is intended to have its most general meaning and not limited to numerical amounts. For example, a spoken message can be a value, so can a geographic location, or a color, etc. For some CS it is permissible for an input parameter(s) to have no value(s) (null) and still participate meaningfully in the execution of the component service. The acceptance of null for an input parameter value and the consequential impact on the CS is described in a CS definition.

Independent and dependent parameters may be variable or constant. Variable parameters are represented by a bold italicized name; e.g., VariableParameter. A constant is manifested by straddling quotation marks. The name of a constant is bold italicized; e.g., "ConstantValueName". Upright characters signify the constant value; e.g., the telephone number "1.201.486.1234". When requested, the compiler shows a list of appropriate parameter constants to a CWS builder. A constant remains unchanged during the execution of a CWS. The value of a named constant can change when an initial condition assignment is made prior to a CS execution. A named constant value, within a CS, cannot change during the execution of the CS. A CS variable can change during the execution of the CS.

The compiler requests that a builder identify desired CS output parameters, if any. Only the output parameters that will be used by another CS of the CWS need to be specified as outputs during the build process. Otherwise, it is not mandatory to specify an available output parameter during the build process. The compiler will not show the excluded output parameters in the CS label within the CWS graphical representation. Input parameters may also be excluded, but only if they are optional.

An important part of the syntactical approach concerns input parameter initial conditions. Initial conditions are values assigned to the CS of a CWS prior to the beginning of CWS execution. Not all values can or need to be initialized. For example, constants within a CS cannot be initialized. A CS builder must assure that named constants and variables have appropriate values prior to their first use in a computation. If appropriate values do not result during a CWS execution before their computational use, the values must be part of initialization. Although variables can have their values recomputed or changed while a CWS is executing, named constants can only have their values changed at an initialization that precedes the beginning of CWS execution. That is, a named constant of a CWS must preserve its value throughout a CWS execution.

The initial conditions of named constants and variables can be established in the following three ways:
1. Assigning an initial value just prior to invocation of the CWS.
2. An initial value assigned by the CWS builder during the build process.
3. A default initial value assigned by the compiler during the build process.

The above three ways have a superseding hierarchy. An initial value assigned prior to invocation supersedes that assigned by a CWS builder. Initialization by a CWS builder supersedes a default value initialized by a compiler. If initialization is done at a computer, downloading to the wireless terminal must be performed to overwrite the prior initial values.

The builder decides which named constants and variables may be initialized by a CWS user. Default initialization and initial value assignments by a builder are means to avoid burdensome initializations by a user. That is, initial values will always assigned, whether default by the compiler or overwritten by the builder. The operation of initialization by a user merely overwrites default values for a selected subset of the parameters at invocation. That is, a user can select the parameters to initialize, from those made available for the user initialization during the build process, prior to invocation of a CWS.

When building a CS, the compiler makes it possible to rename parameters of a CS, irrespective of being a variable or a named constant within a CWS. The compiler provides this option by associating generic names with those specified by the builder. This association is preserved so that the compiled CWS has the parameter names it understands.

Named constants and variables, having names that only appear within a CS, are local to that CS. If these parameters are inputs or outputs of a CS, they are global for all CS within a CWS. If a named constant or variable is an input or output of a CWS, it is also global to all linked CWS. The compiler recognizes this globalization for parameter names and assists in mitigating conflicts when CWS linkage is built. The significance of local versus global is the reuse of identifications. That is, identifications that do not extend beyond boundaries may be reused without conflict; otherwise they must have consistent significance across boundaries. However, parameter name aliasing tables are created by the compiler that allow internal names to deviate from boundary names.

The final part of the syntactical approach addresses specific examples of built Invoke services. Annotations are included for the examples and throughout the syntax definition for clarification and/or restrictions.

The syntactical definition of Invoke follows.

Invoke facility service: Senses the events required to invoke the operation of an associated CWS. Every CWS is associated with an Invoke component service in order to instigate an invocation of operation.

Syntax:
({OptionalEventExpression}, (OptionalEventDurationList), OptionalObservationRepetitionInterval, (OptionalPasswordPair), (OptionalDisableQuadruple), OptionalEnablingSwitch, OptionalInitialConditionsAssignmentList, (OptionalLinkedCWSList), (OptionalLinkedCWSPasswords), (OptionalLinkedCWSData), (OptionalNotifications))
=Invoke ({OptionalEventExpression}, (OptionalEventDurationList), OptionalObservationRepetitionInterval, (OptionalPasswordPair), (OptionalDisableQuadruple), OptionalEnablingSwitch, (OptionalInitialConditions AssignmentList), (OptionalLinkedCWSList), (OptionalLinkedCWSPasswords), (OptionalLinkedCWSData), (OptionalNotifications))
Where:
{OptionalEventExpression}—An optional Boolean expression containing assertions of recognized events that are to control the invocation (or execution) of an associated CWS. Each event assertion contains a Boolean value of "True" or "False". That is, when an event takes place, the assertion is "True". If the event has not occurred, the event assertion is "False". Prior to the observation of an event's occurrence, it is assumed to be "False". If upon examination it is discovered that the event occurred, a "True" value will be assigned. If the Boolean expression results in a "True" value as a consequence of the event assertion values (either True or False values), the CWS will be invoked into execution. Afterwards, the assertion event values will remain the same until reassigned by a CS or after the CWS has completed its execution. If the builder does not include {OptionalEventExpression} within Invoke facility service, a default Boolean expression will be assigned by the compiler during the build process. There is no intent herein to restrict possible default Boolean expressions. However, one possibility is that of a user scrolling through a wireless mobile terminal's CWS list and selecting the CWS to be invoked via a touch screen. An {OptionalEventExpression} will not have its parameter appear within the graphical representation of Invoke when a default Boolean expression is deployed. The default event, of a user selecting a CWS from wireless mobile terminal's CWS list, can also be selected by a builder to be included within {OptionalEventExpression}. The use braces "{ . . . }" distinguishes the {OptionalEventExpression} from other Invoke parameters and identifies it as a Boolean expression of parameters that represent events. The parameters are of a general type i.e., a textual message, a special ring signal, an audio message (includes voice recognition), an image, a video, data (as a single, n-tuple, array, or structure), etc. The event parameters are linked by Boolean connectives; i.e.; "and", "or", "not", "if X, then Y"; wherein "X" and "Y" represent event parameters.

(OptionalEventDurationList)—An optional list of pairs where each pair designates an event name and its value of "sustained" or "momentary". A "sustained" event must have its occurrence persist from the time first observed and then persist for each repeated observation to also have a "True" value. A "momentary" event occurrence only needs to be observed once for a "True" value. A significant distinction of the two event durations is that sustained events may experience value changes between "False" and "True" as observations are repeated. A momentary event will not revert back to a "False" value after its occurrence establishes a "True" value. Commas are used to distinguish parameters apart from the Boolean expression. The (OptionalEventDurationList) parameter follows the first comma. If a builder does not provide a list, all events are designated as "momentary" by the compiler. Furthermore, (OptionalEventDurationList) will not have its parameter appear within the graphical representation of Invoke when the default values are deployed.

OptionalObservationRepetitionInterval—This parameter specifies the interval at which the observations are to be made to determine whether events have occurred. The repetition interval parameter can be a constant, named constant, or a variable. Its value has the format "days:hours:minutes:seconds"; wherein seconds can contain a decimal fraction part, but days, hours, and minutes must be whole numbers. The OptionalObservationRepetitionInterval parameter follows the second comma. If a builder does not specify an OptionalObservationRepetitionInterval, the compiler will provide a default value which depends upon the type of event. Furthermore, OptionalObservationRepetitionInterval will not have its parameter appear within the graphical representation of Invoke when the default values are deployed.

(OptionalPasswordPair)—This parameter is intended to provide password protection of a CWS. That is, the password that will permit the invocation of a CWS. The pair contains an optional password name and an optional password value. A builder has the choice to leave both members of the pair blank, deploy either one of the two pair members, or deploy both pair members. A password request will be made after a successful ("True") Boolean expression result and only if a builder specifies this parameter for an Invoke facility service. This parameter is a general type; e.g., a keypad textual entry, a special externally generated ring signal, voice recognition of a recorded message. The (OptionalPasswordPair) represents the means to enhance CWS security. Without it, invocation can be enacted from the list of CWSs in the wireless mobile terminal. The (OptionalPasswordPair) parameter follows the third comma. If a builder elects not to deploy (OptionalPasswordPair), its parameter will not appear within the graphical representation of Invoke and no password request will be made prior to CWS invocation.

(OptionalDisableQuadruple)—A quadruple of parameters consisting of the name of maximum permitted number of failed password attempts, the value of maximum permitted number of failed password attempts, the name of amount of time the CWS will be disabled if the number of failed attempts reaches the maximum, and the value of the amount of time the CWS will be disable (in days:hours:minutes). The request for the password entry is made after each failed attempt and until the maximum has been reached. The (OptionalDisableQuadruple) parameter follows the fourth comma. If a builder elects not to deploy (OptionalDisableQuadruple), its parameter will not appear within the graphical representation of Invoke and no limit will exist for failed password attempts. The (OptionalDisableQuadruple) cannot exist without an (OptionalPasswordPair).

OptionalEnablingSwitch—Switches to either enable or disable the CWS invocation. The switch state can only be established by the wireless service provider or by downloading the state from a computer that is used to build the CWS. Its value is stored as an initial condition. The {OptionalEventExpression} will not be evaluated if the CWS is disabled. A principal use is to re-enable a CWS after it has been disabled by excessive password failures and the password has been forgotten. The OptionalEnablingSwitch parameter follows the fifth comma. If a builder elects not to deploy OptionalEnablingSwitch, its parameter will not appear within the graphical representation of Invoke. Some wireless service providers may obligate the inclusion of this parameter.

(OptionalInitialConditionsAssignmentList)—An optional list of pairs that consist of builder selected CWS parameters (named constants and variables) and their initial values when the CWS begins its execution. A display of these pairs will appear on the wireless mobile terminal after a "True" value results for the Boolean expression and, if password protected, an acceptable password was entered. A user will have an opportunity to change initial values for the CWS named constants and variables that appear within this parameter. If a named constant or variable is excluded from this list, their initial value must remain the same as that assigned during the build process. This parameter is useful to configure or provision a CWS subsequently to its originally built configuration. The (OptionalInitialConditionsAssignmentList) parameter follows the sixth comma. If a builder elects not to deploy (OptionalInitialConditionsAssignmentList), its parameter will not appear within the graphical representation of Invoke and no request for initial conditions will be made.

(OptionalLinkedCWSList)—An optional list of pairs that indicate the names of potentially linked CWSs and their addresses. The list identifies other CWSs, by their names, from which data may be received. After a successful ("True") Boolean expression and no (OptionalPasswordPair) failure, the potentially linked CWS address is used to request linkage for acquiring data. The name and address of the CWS requesting linking is included within the link request to confirm authorization for acquiring data. If the potentially linked CWS and the data recipient CWS are within the same wireless mobile terminal, then the address is "Local". Otherwise, an address that is appropriate for the type communication link must accompany the potentially linked CWS name. These addresses can be a World Wide Web (http) site, an e-mail address, a Bluetooth address, a phone number, an Internet address, an Ethernet address, or a private network address. The (OptionalLinkedCWSList) parameter follows the seventh comma. If a builder elects not to deploy (OptionalLinkedCWSList), its parameter will not appear within the graphical representation of Invoke and no request for linkage will take place.

(OptionalLinkedCWSPasswords)—An optional list of pairs that associate potentially linked CWSs with passwords for those potentially linked CWSs having password protection. The passwords are entered into this parameter when the Invoke facility service is built. The data recipient CWS responds with the associated password after the potentially linked CWS makes its password request. Only the potentially linked CWSs having password protection are included within this parameter. The (OptionalLinkedCWSPasswords) parameter follows the eighth comma. If a builder elects not to deploy (OptionalLinkedCWSPasswords), its parameter will not appear within the graphical representation of Invoke and no password replies will be made to potentially linked CWSs. The (OptionalLinkedCWSPasswords) cannot exist without an (OptionalLinkedCWSList).

(OptionalLinkedCWSData)—An optional list of pairs; where the first member of a pair is a linked CWS name and the second member is a list of pairs that associate named constants and variables with memory locations into which a linked CWS will enter values. The data names, first member of the list of pairs, are the names used within the linked CWS (source of data). These names need not coincide with the data names used within the data recipient CWS. However, the builder of the data recipient CWS must know the name of the desired data within the linking CWS. The builder establishes a data alias table that associates the desired linked CWS data names with corresponding recipient CWS data names. It is crucial that the type of each transmitted data, from the linked CWS, is the same data type used by the recipient CWS. The transmitted data is entered into a recipient CWS' data fields in the same manner as that for (OptionalInitialConditionsAssignmentList). Place holders are established for the transmitted data values before entries are made by the linked CWS. However, the compiler will not provide a default value into a place holder. A builder must enter each value into each data place holder to establish the proper data type. Hence, a builder must have thorough knowledge of the data to be acquired from a linked CWS. If a named constant or variable is transmitted from more than one linked CWS, overwriting data will cause the last value entry to be used during the recipient CWS execution. Moreover, the (OptionalInitialConditionsAssignmentList) is enacted after linked CWS data transmission; i.e., (OptionalLinkedCWSData). This results in prioritization of user entered data via the (OptionalInitialConditionsAssignmentList). The (OptionalLinkedCWSData) parameter follows the ninth comma. If a builder elects not to deploy (OptionalLinkedCWSData), its parameter will not appear within the graphical representation of Invoke and no data will be received from a linked CWS. The (OptionalLinkedCWSData) cannot exist without an (OptionalLinkedCWSList).

(OptionalNotifications)—This is an optional n-tuple to provide notification concerning the operation of the Invoke service after the Boolean expression was evaluated as "True". No notifications are reported when the Boolean expression remains "False". A successful password entry is not necessary for the enactment of a notification. The notification n-tuple consists of four parts: a) notification cause, b) type of address for notification recipient, c) address of notification recipient; d) explanation message. It is the responsibility of the Invoke facility service to communicate the notification message to the designated address when a "cause" is observed. The principal intended use of (OptionalNotifications) is to provide an execution failure message or warnings about the ensuing CWS execution. However, a notification is available if desired, after a successful CWS invocation and an accompanying textual message could indicate this success. The potential address types to which the message could be sent are a World Wide Web (http) site, an e-mail address, a Bluetooth address, a phone number, an Internet address, an Ethernet address, or a private network address. The representation of messages is not limited to a textual format. It may be in the form of a special ring signal, a recorded audio signal, an image, a recorded video signal, a wireless mobile terminal vibration, general data (as a single, n-tuple, array, or structure). Other notifications "causes" are excessive invalid (OptionalPasswordPair) entry attempts, the CWS had been disabled, the inability to disable a CWS, the inability to enable a CWS, an unsuccessful CWS provisioning attempt by a user's initial conditions assignment with the builder selected named constants and variables, a failure in an attempt to link with another CWS, a password rejection by a potentially linked CWS, invalid data from a linked CWS, a change of location of the wireless mobile terminal, a wireless network problem, a notification from the wireless service provider, and unable to complete invocation for an unknown reason. The message associated with a "cause" is selected by the builder and should be appropriate for the "cause" parameters; e.g., if the "cause" corresponds to a textual password, then a textual output is usually preferable. As an input to Invoke, the (OptionalNotifications) parameter contains all potential quadruples (cause, address type, address, message). As an output of Invoke, only the quadruples for which a "cause" was observed appear in the (OptionalNotifications) parameter. The (OptionalNotifications) parameter follows the tenth comma. If a builder elects not to deploy (OptionalNotifications), its parameter will not appear within the graphical representation and no notifications will be provided.

Initial Conditions:

{OptionalEventExpression}, when included by the Invoke builder, will initially have the value prescribed when the CWS is built. Otherwise, the default initial condition programmed within the compiler will be used and no Boolean expression parameter will be visible within the graphical representation of Invoke. The default Boolean expression is assigned by the compiler during the build process and may vary according to a wireless service provider's preference. One possibility is that of a user scrolling through a wireless mobile terminal's CWS list and selecting the CWS to be invoked via a touch screen. It should be emphasized that this example places no restrictions of potential default Boolean expressions.

(OptionalEventDurationList), when included by the Invoke builder, the events will initially be of the durations (sustained or momentary) prescribed when the CWS is built. Otherwise, the default initial duration of "momentary" will be assigned by the compiler and no duration list parameter will be visible within the graphical representation of Invoke.

OptionalObservationRepetitionInterval, when included by the Invoke builder, will initially have the value prescribed when the CWS is being built. Otherwise, the default value programmed within the compiler will be used and no repetition interval parameter will be visible within the graphical representation of Invoke. The default repetition interval value, assigned by the compiler during the build process, varies according to a wireless service provider's preference.

(OptionalPasswordPair), when included by the Invoke builder, will initially have the value prescribed when the CWS is being built. When not included by a builder, no password parameter exists and this parameter will not appear within the graphical representation of Invoke.

(OptionalDisableQuadruple), when included by the Invoke builder, will initially have the value prescribed when the CWS is being built. When not specified by a builder, no (OptionalDisableQuadruple) parameter exists and therefore this parameter will not appear within the graphical representation of Invoke. If a password is used for Invoke, but not this parameter, then there is no limit for unsuccessful password attempts.

OptionalEnablingSwitch, when included by the Invoke builder, it is expected that the value of "Enabled" will be assigned as the initial condition. If "Disabled" is assigned by the builder, the associated CWS will not execute. A change from a disabled state to an enabled state, of a CWS within a wireless mobile station, may be made by the wireless service provider. A builder may also make this change by revising the initial condition for the CWS and again downloading the CWS to the wireless mobile station. A CWS may become disabled when certain error conditions appear; e.g., excessive failed password entry attempts. Also, a wireless service provider may choose to disable a CWS because of causing network problems. If a builder elects not to specifically include OptionalEnablingSwitch, its parameter will not appear within the graphical representation of Invoke. However, the parameter nevertheless exists for Invoke, having the default initial condition of "Enabled".

(OptionalInitialConditionsAssignmentList), when included by the Invoke builder, will provide an opportunity for a wireless mobile terminal user to provision or configure a CWS prior to its execution by changing the initial conditions of named constants and variables. Because the compiler obliges the builder to provide initial values for all named constants and variables within a CWS, default values are not necessary. If a builder elects not to deploy (OptionalInitialConditionsAssignmentList), this parameter will not exist and will not appear within the graphical representation of Invoke.

(OptionalLinkedCWSList), when included by the Invoke builder, will initially have the CWS link list prescribed when the CWS is being built. When not included by a builder, no (OptionalLinkedCWSList) parameter exists and therefore this parameter will not appear within the graphical representation of Invoke.

(OptionalLinkedCWSPasswords), when included by the Invoke builder, will initially have the CWS link list passwords prescribed when the CWS is being built. When not included by a builder, no (OptionalLinkedCWSPasswords) parameter exists and therefore this parameter will not appear within the graphical representation of Invoke.

(OptionalLinkedCWSData), when included by the Invoke builder, will initially have the values for named constants and variables as prescribed by the CWS builder. When not included by a builder, no (OptionalLinkedCWSData) parameter exists and therefore this parameter will not appear within the graphical representation of Invoke.

(OptionalNotifications), when included by the Invoke builder, will initially have the n-tuples consisting of a) notification causes, b) type of address for notification recipient, c) address of notification recipient, d) explanation message, as prescribed when the CWS is being built. When not included by a builder, no (OptionalNotifications) parameter exists and therefore this parameter will not appear within the graphical representation of Invoke.

EXAMPLES

Invoke

In the preceding, the CWS is invoked according to the compiler's default setting. One such setting is selecting the CWS from the wireless mobile terminal's CWS list. This is the simplest use of Invoke that was implied within U.S. Pat. No. 7,424,292 and the U.S. Provisional Application for Patent 60/454,412.

Invoke ({"HeartMonitorAlarm"},, "0:0:1:0")

In the preceding, the CWS application is being invoked by a remote heart monitor with a wireless link to a wireless mobile terminal; e.g., by a "Bluetooth" communication link. Both the heart monitor and the wireless mobile terminal are local to the alarmed victim. Because no information follows the first comma, the builder did not include (OptionalEventDurationList) as a parameter; which defaults the "HeartMonitorAlarm" event to be momentary. The constant following the second comma applies to OptionalObservationRepetitionInterval and is shown to have the value of one minute. No other parameters are used for this Invoke example. The associated CWS, after invocation may execute a location CS, then the CWS may call "911" and transmit a voice recording to request an ambulance to the victim's determined location. Additional data can be gathered by the heart monitor and transmitted to the victim's physician for analysis via the wireless mobile terminal's CWS.

Invoke ({"InCar" and ("Mary'sTakeMeToHospital" or "John'sTakeMeToHospital")}, (("InCar", "Sustained"), ("Mary'sTakeMeToHospital", "Momentary"), ("John'sTakeMeToHospital", "Momentary")))

In the preceding, it is necessary that an automobile sensor determines that the wireless mobile terminal is in the automobile. This may be possible by having a seat weight sensor, analogous to the unbuckled safety belt sensor, wirelessly communicate with the terminal. By means of the conjunction and, the additional occurrence of either one of two events occur; namely "Mary'sTakeMeToHospital" or "John'sTakeMeToHospital" will result in the CWS invocation. During CWS compilation, Mary and John both recorded their voice prints. When a health threatening emergency occurs while driving the car, either person need only speak the recorded message to the wireless mobile terminal and invoke the CWS. An (OptionalEventDurationList) follows the Boolean expression. It indicates that the named constant "In Car" is a sustained parameter. That is, whenever it is unobserved, its value will be "False". The remaining events are momentary and remain at a "True" value after their first observance. Additional Component Services (CS) within the CWS can determine the nearest hospital to the automobile's present location. Afterwards, a GPS CS can provide driving directions to the nearest hospital.

(,,,,,,,,(StockNames, ClosingPrices), InvocationNotification)=Invoke ({"TradingEndTime"},,,,,,((StockPrices, www.MyBroker.com)), ((StockPrices, "Password")), ((StockNames, ClosingPrices)), (("LinkSuccess", "TelephoneNumber", "1.973.123.4567", "StockTextMessage")))

The invocation event of the preceding is the named constant "TradingEndTime" which equals the time of day that a stock market ends its trading. This CWS will therefore be invoked when the stock market closes. The following seven commas indicate that six parameters, starting with (OptionalEventDurationList) and ending with OptionalInitialConditionsAssignmentList, were not selected by the builder. The builder does not need to insert these commas. A blank space and a comma are inserted by the compiler upon a builder's decision to disregard a parameter. The next selected parameter is (OptionalLinkedCWSList), which contains only one (linking CWS, address) pair; namely (StockPrices, www.MyBroker.com). The linking CWS password follows with only the pair (StockPrices, "Password"). The data requested from the linking CWS is a list of pairs, where the variables "data names" are StockNames for which the "data" ClosingPrices are to be listed. Only one (OptionalNotifications) quadruple is built; i.e., ("LinkSuccess", "TelephoneNumber", "1.973.123.4567", "StockTextMessage"). The "cause" to communicate the notification is a successful CWS linkage by the constant "LinkSuccess". A text message, contained within the named constant "StockTextMessage" is to be sent to the wireless mobile terminal address constant "1.973.123.4567". The Invoke outputs, following a successful CWS linkage and data transfer, will contain a list of closing stock names and their accompanying stock prices in the pair (StockNames, ClosingPrices) and the previously described (OptionalNotifications) within the variable InvocationNotification. If linkage is successful, but data is not properly transferred, invalid data will not appear in the output. Lack of linkage will not produce a notification nor enact data communication. The remainder of the CWS could do a variety of operations with internal CSs. For example, a CS could analyze linkage problems and take appropriate actions, another CS could organize communicated data in a desired format, another possibility is to graph the price/date variation by using a stored data base, trigger actions to be taken according to prescribed thresholds, etc.

An interactive compiler is used to build a CWS. The interactivity with the compiler guides and simplifies the building of a CWS, including building its desired Invoke facility service. The guiding and simplification is achieved by: a) requesting builder responses to queries to establish whether an Invoke parameter is to be used and if so, the parameter's initial value; b) denying invalid builder responses to the queries; c) recommending valid alternatives to a builder, subsequently to an invalid response; d) providing salient "help" advice to a builder, relating to a compiler query; e) availing to a builder, a description on the use and purpose of the Invoke facility service. The Invoke parameters and their components, for which compiler interactivity takes place, are:

{OptionalEventExpression}—establishing event durations, event values, and logical connectives between events to assist the creation of a Boolean expression;

(OptionalEventDurationList)—establishing a list of pairs that designates whether each event is to be "sustained" or to be "momentary";

OptionalObservationRepetitionInterval—establishing the interval at which the observations are to be made to determine whether events have occurred;

(OptionalPasswordPair)—establishing an invocation password to protect from unauthorized execution of a CWS;

(OptionalDisableQuadruple)—establishing a quadruple of parameters that indicate the name and value of the maximum permitted number of failed password attempts and the name and value of the amount of time (in days:hours:minutes) the CWS will be disabled if the number of failed attempts reaches the maximum;

OptionalEnablingSwitch—establishing a parameter that will switch the CWS invocation state to either enabled or disabled;

(OptionalInitialConditionsAssignmentList)—establishing a list of parameter pairs, each pair consisting of a CWS parameter name (named constants and variables) and the CWS parameter initial value when the CWS begins its execution;

(OptionalLinkedCWSList)—establishing a list of parameter pairs, each pair consisting of a CWS name to which the Invoke associated CWS is to be linked and the potentially linked CWS address;

(OptionalLinkedCWSPasswords)—establishing a list of parameter pairs, each pair consisting of a CWS name to which the Invoke associated CWS is to be linked and the potentially linked CWS password required for linking;

(OptionalLinkedCWSData)—establishing a list of parameter pairs, each pair consisting of a parameter name (constant and variable) and a memory location into which a linked CWS will enter the value of the named parameter;

(OptionalNotifications)—establishing a list of parameter quadruples to provide notification concerning the operation of the Invoke service, each quadruple consisting of the cause for a notification, the type of address for the notification recipient, the address for the notification recipient, and a notification explanation message.

Events play an important role for the Invoke facility service. Therefore, the breadth of event types needs to be broached. They are shown for the following categories:

Timing Events—
a) A specified time of day,
b) A specified day of the week,
c) A specified day of the month,
d) A specified day of the year,
e) A specified combination of the aforementioned day types.

Events Locally Established by the Wireless Mobile Terminal—
a) Sending a specified audio signal,
b) Sending an audio signal to a specified address,
c) Sending a specified video signal,
d) Sending a video signal to a specified address,
e) Sending a specified text message,
f) Sending a text message to a specified address,
g) Sending a specified photograph,
h) Sending a photograph to a specified address,
i) Sending an e-mail with a specified subject,
j) Sending an e-mail to a specified address,
k) Sending any audio signal,
l) Sending any video signal,
m) Sending any text message,
n) Sending any photograph,
o) Sending any e-mail,
p) Connecting to a specified Internet address,
q) Disconnecting from a specified Internet address,
r) Dialing of a specified telephone number,
s) Dialing of any telephone number,
t) Taking any photograph,
u) Recording any video,
v) Entering a specified geographical location,
w) Leaving a specified geographical location.

Events not Locally Established by the Wireless Mobile Terminal—
a) Receiving a specified audio signal,
b) Receiving an audio signal from a specified address,
c) Receiving a specified video signal,
d) Receiving a video signal from a specified address,
e) Receiving a specified text message,
f) Receiving a text message from a specified address,
g) Receiving a specified photograph,
h) Receiving a photograph from a specified address,
i) Receiving an e-mail with a specified subject,
j) Receiving an e-mail from a specified address,
k) Receiving any audio signal,
l) Receiving any video signal,
m) Receiving any text message,
n) Receiving any photograph,
o) Receiving any e-mail,
p) A specified "caller ID" for an incoming voice call,
q) A specified "caller ID" for an incoming text message,
r) A specified "caller ID" for an incoming photograph,
s) A specified "caller ID" for an incoming video signal,
t) A specified incoming signal from a remote Internet site,
u) A specified address of an incoming signal from a remote Internet site,
v) A specified incoming signal from a wireless service provider,
w) The specified date of an incoming e-mail,
x) A specified incoming signal value from a communication linked transducer.

Communication Linked Transducers—
a) Biological sensors that convert heart rate, systolic blood pressure, diastolic blood pressure, red blood cell oxygen level, blood glucose, body temperature, or electroencephalogram brain activity into a binary digital signal representation that is communicated to the wireless mobile terminal;
b) Mechanical sensors that convert acceleration force, deceleration force, temperature in a solid, temperature in a liquid, temperature in a gas, pressure upon a solid, pressure upon a liquid, pressure upon a gas, or altitude to a binary digital signal representation that is communicated to the wireless mobile terminal;
c) Chemical sensors that convert acidity, specific gravity, temperature of a solution, viscosity of a liquid, or molarity of a chemical solution to a binary digital signal representation that is communicated to the wireless mobile terminal;
d) Electrical sensors that convert voltage, current, power, magnetic flux, resistance, reactance, impedance, capacitance, inductance, electrical signal bit rate, or electrical signal frequency to a binary digital signal representation that is communicated to the wireless mobile terminal;
e) Any combination of the aforementioned four sensor types and constituent signals.

An example of the compiler interactions and graphical aspects of the invention will now be broached. For the example, consider someone with a life threatening ailment such as heart disease. From past experience, this person is able to recognize the precursor symptoms that may be life threatening. Furthermore, this person's employment often requires travel by automobile in unfamiliar locations. The following CWS steps can potentially save this person's life:
1. Invocation, while driving, upon speaking "Direct me to a hospital" to the wireless mobile terminal,
2. Establishing one's wireless mobile terminal location,
3. Invoking one's web browser,
4. Logging onto one's cloud server,
5. Having the cloud server determine the hospital nearest to one's location,
6. Invoking the terminal's GPS capability for the fastest path directions to the nearest hospital,
7. Dialing "911" and, upon connecting, having recorded voice and text messages communicated.

FIG. 1 illustrates the first part of building a new CWS. The building process is begun by clicking on the "tool" button labeled "Build" 1. The first builder's action encompasses clicking on and holding the cursor arrow 2, shown in its resting place. The cursor arrow 2 is then dragged to point to the "Build" button area. After releasing the cursor, while pointing to Build button, a window appears that requests the name for the CWS 3. The builder is shown to have entered the CWS name of DirectMeToHospital 4. After the keyboard "Enter" key is depressed, the second window appears 6. The cursor arrow 2 now returns to the upper left corner (resting place) and awaits future use; e.g., to point to buttons and to drag icons while building the CWS. The second window 6 provides instructions to have the CWS included within the "Services Menu" 7 and thereby use it as a future CS within some other CWS to be built. Instructions also appear for having password protection for such future use 8.

Figure 2:
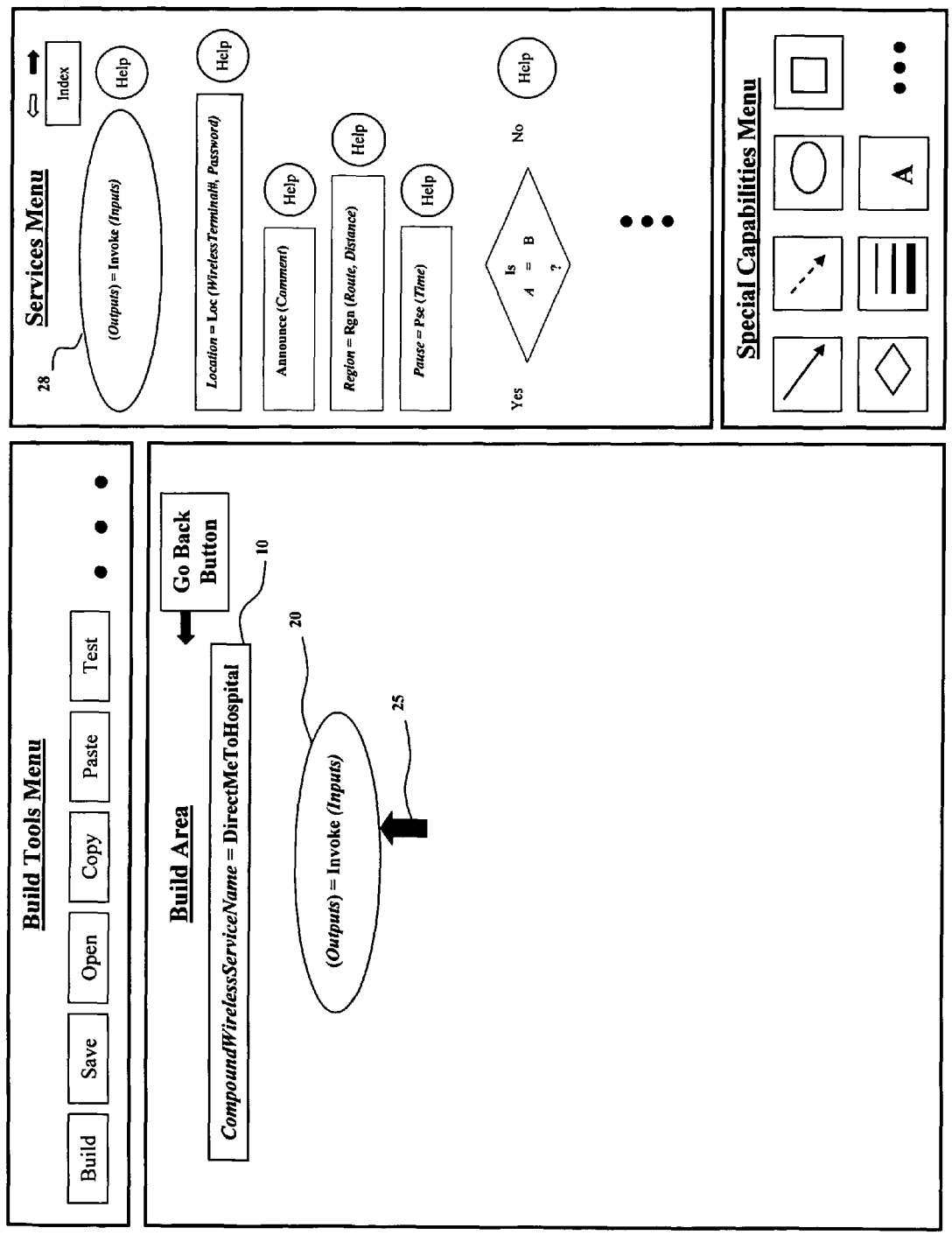
FIG. 2 shows how the Invoke facility service is graphically dragged to become a component service of a compound wireless mobile communication service that is being built.

The entry table window 8 contains default values for inclusion within the Services Menu ("Yes") and "No" password protection. Inclusion within the Services Menu signifies that the CWS being built can become a CS within another CWS. The builder has the choice of overriding the default values by making entries in the appropriate table cells 8, but decides to maintain the default values. The compiler stores the builder's decisions when the "Enter" key is depressed the second time. FIG. 2 will now appear with a window displaying the CWS name 10.

Figure 3:
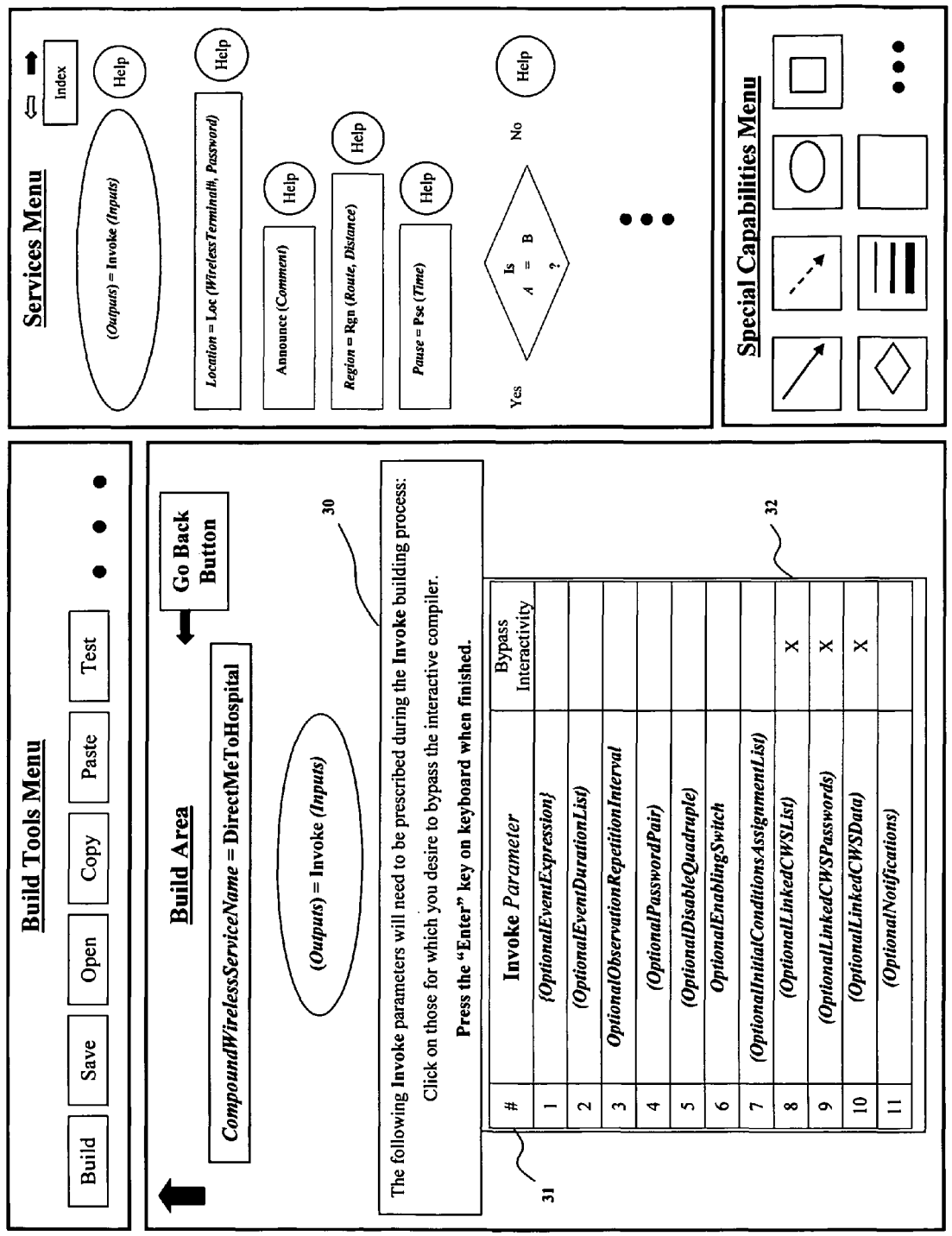
FIG. 3 identifies the parameter components that are available for the Invoke facility service.
Figure 4:
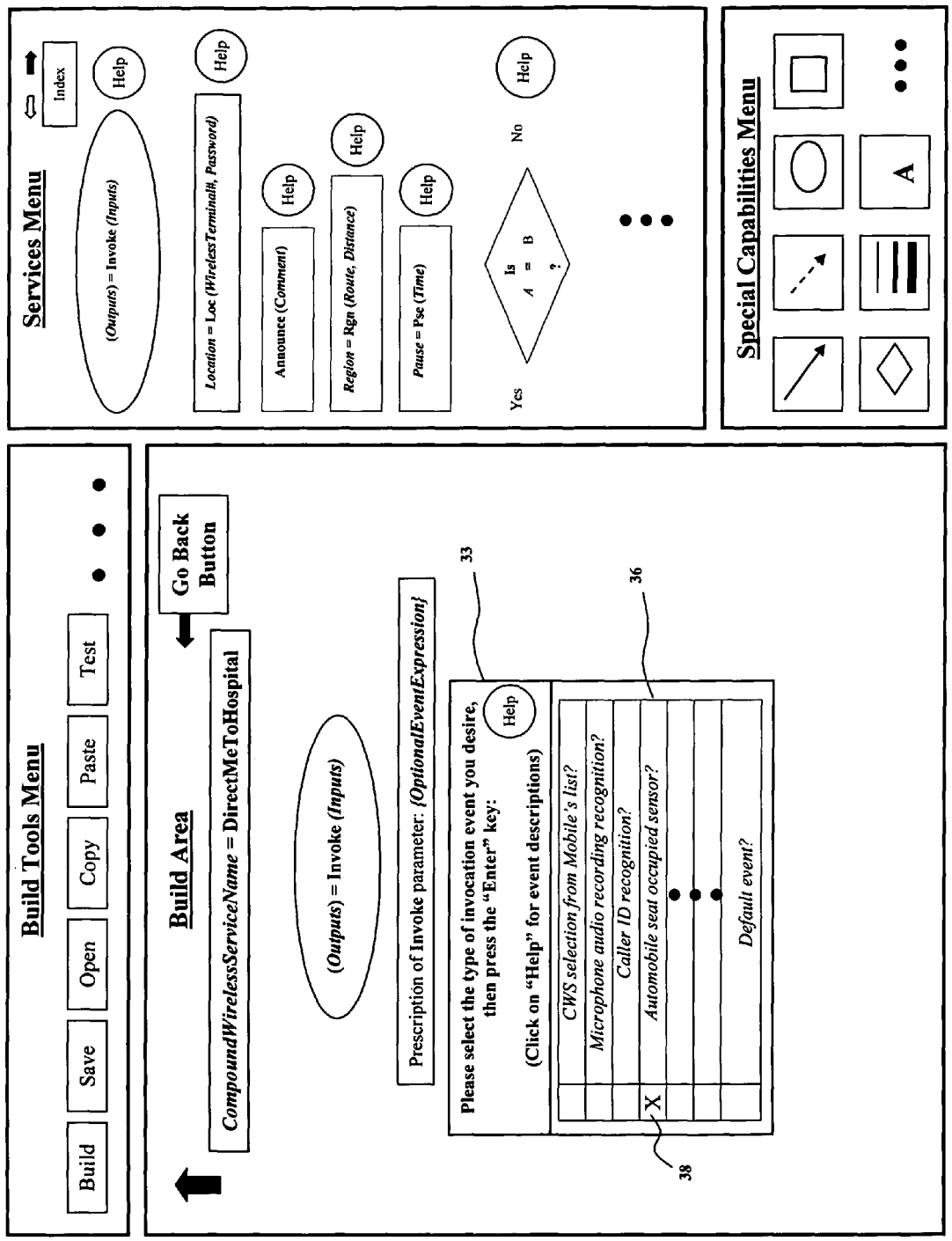
FIG. 4 demonstrates how an event type is selected for use as a Boolean OptionalEventExpression parameter of the Invoke facility service.

FIG. 2 also shows the result of dragging the Invoke CS 20 with the cursor arrow 25 from the Invoke CS's position 28 in the Services Menu. The most general names of (Inputs) and (Outputs) appear as the Invoke parameters within FIG. 2. When the cursor arrow is released, the windows of FIG. 3 appear. One of the windows 30 provides instructions for the FIG. 3 compiler interactivity. This window 30 indicates that names of the eleven Invoke parameters are cited below 31 and that compiler interactivity may be bypassed by clicking on the selected rows of the parameter table. Rows 8 through 10 were selected by the builder 32. The consequence of bypassing compiler interactivity is that no compiler dialog is conducted and the builder will need to directly prescribe the properties for these parameters. The intent is to hasten building a CWS for those steps that are well understood by the builder. After the builder presses the "Enter" key, window of FIG. 4 appears, containing a new window 33 for selecting the first invocation event for the Boolean expression.

The builder is shown to have chosen Automobile seat occupied sensor 36 as a type of event for CWS invocation by clicking on its selection box 38 with the cursor. That is, an event signal is sent to the wireless mobile terminal when someone occupies a seat in the automobile.

Figure 5:
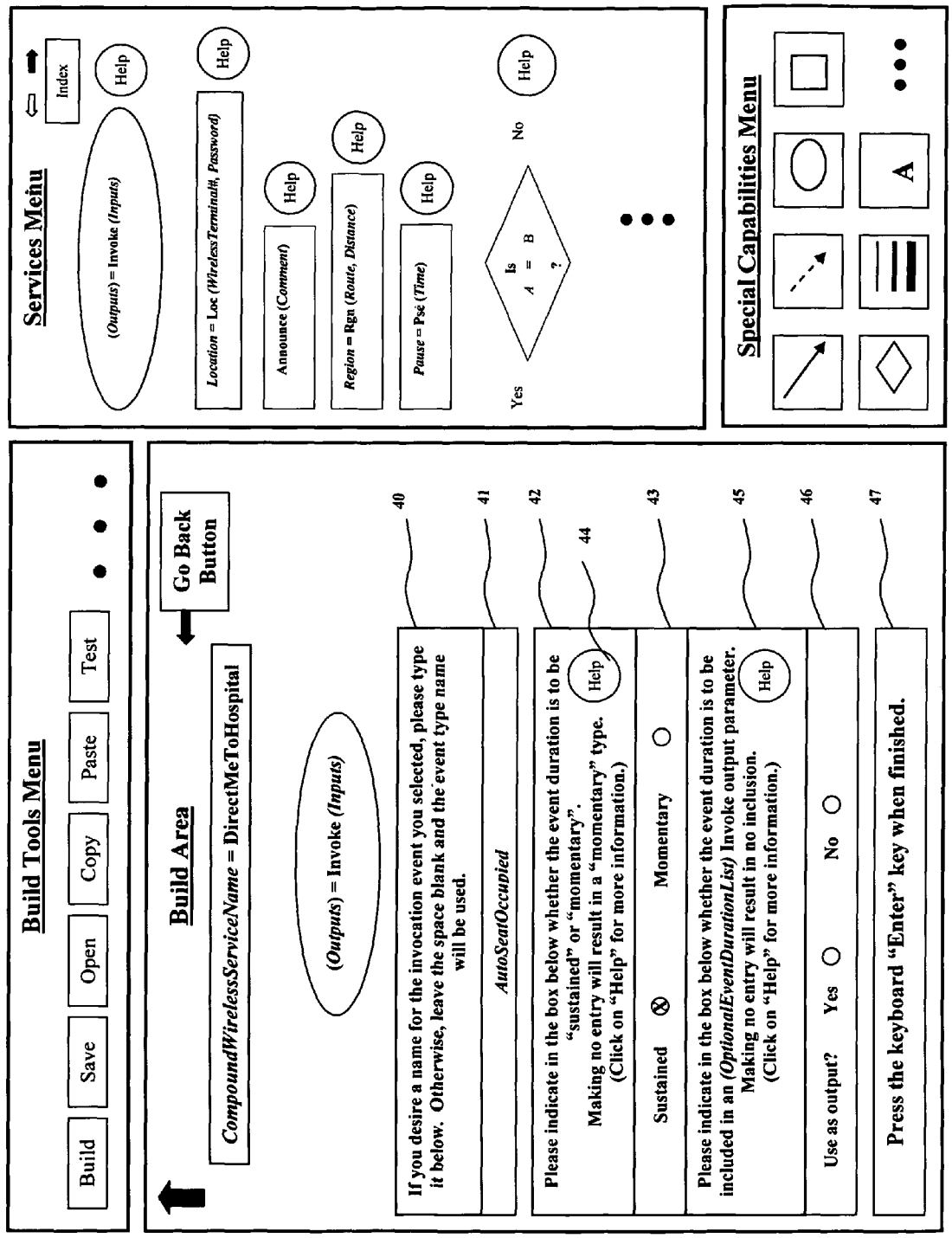
FIG. 5 shows how a name is specified for an event to be used within a Boolean OptionalEventExpression parameter of the Invoke facility service.

After the builder depresses the "Enter" key, the windows of FIG. 5 will appear. The builder is now provided with an option to name the selected event 40. A window 41 shows that the event name AutoSeatOccupied was entered by the builder. Had the builder not entered a name, the default event type name of AutomobileSeatOccupiedSensor would appear in the event expression for CWS invocation. The lower window 42 requests that the event duration be prescribed. The builder selected the event AutoSeatOccupied is to be "sustained" 43. A "Help" button 44 is available, which when clicked, will provide detailed definitions of the two event durations. A window also exists that inquires whether duration assigned to the AutoSeatOccupied event is to be part of the Invoke output 45. Because the builder decided not to respond 46, the default of not being an output will exist. After the "Enter" key 47 is depressed, the windows of FIG. 6 will appear. Had the builder provided a "Yes" response 46, a different window would have appeared to create the output for the output parameter for (OptionalEventDurationList) and the compiler would pose the query for a name substitution for (OptionalEventDurationList).

Figure 6:
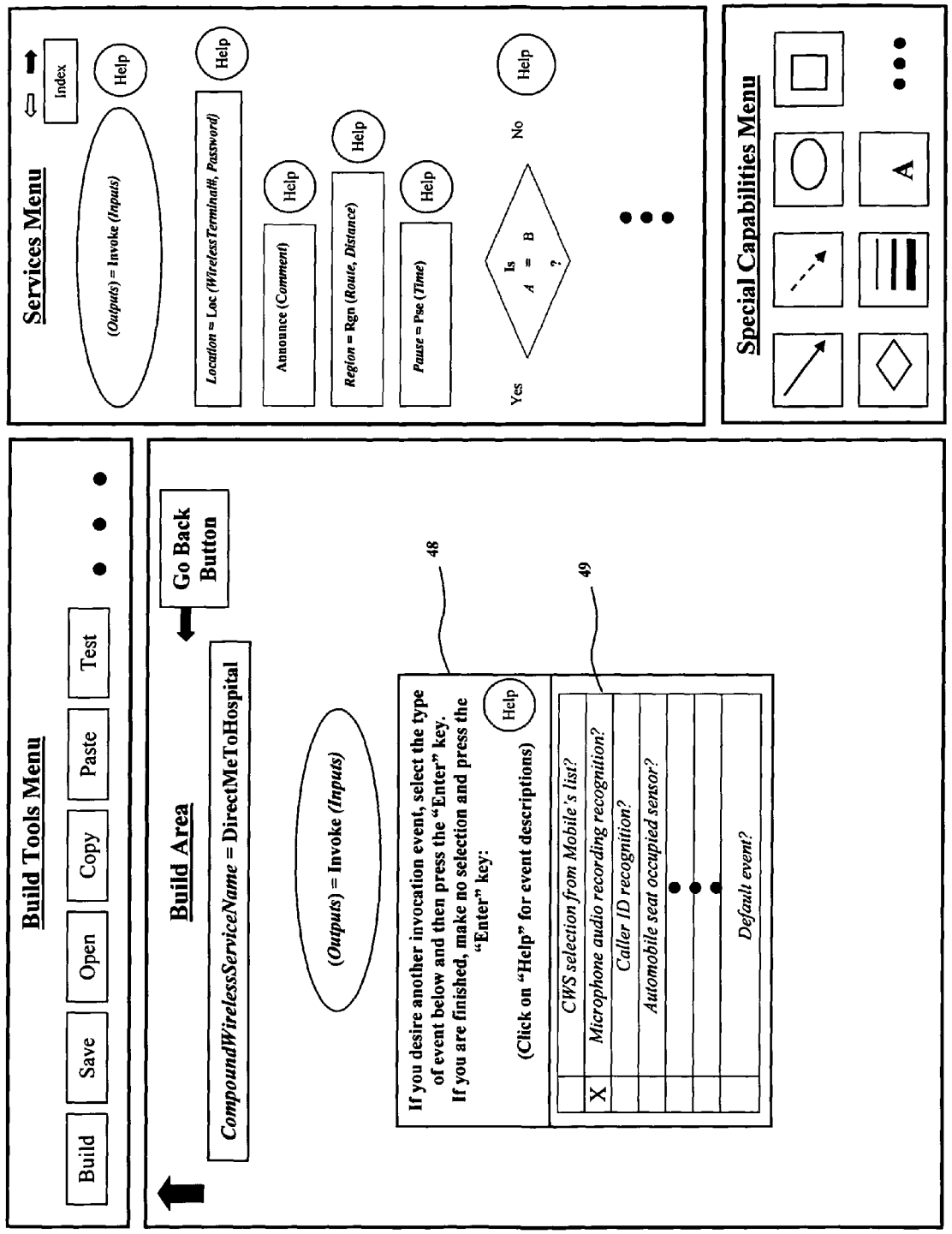
FIG. 6 demonstrates how another event type is selected for use as a Boolean OptionalEventExpression parameter of the Invoke facility service.
Figure 7:
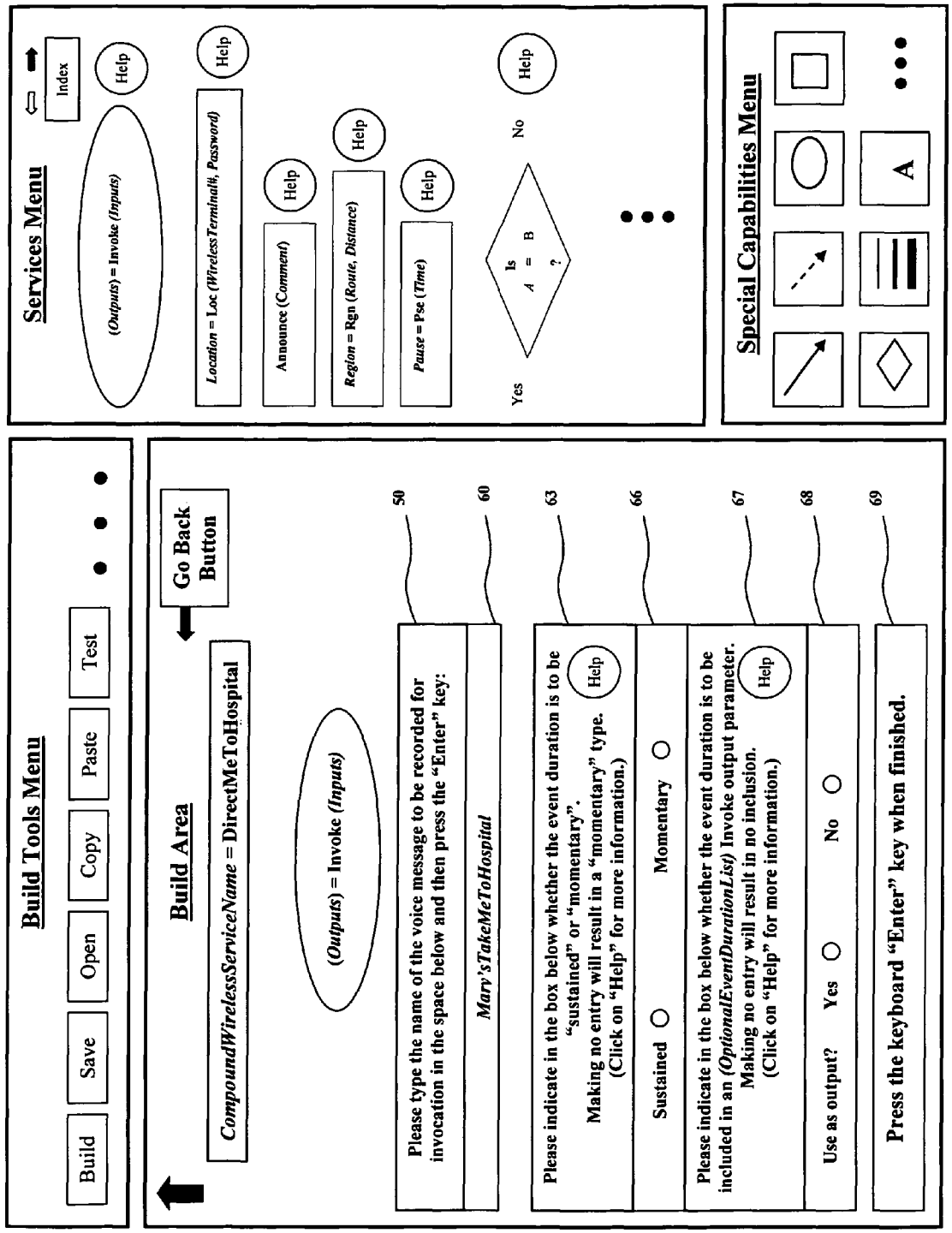
FIG. 7 shows how a name is specified for the second event to be used within a Boolean OptionalEventExpression parameter of the Invoke facility service.

In FIG. 6, the builder is queried 48 as to whether another invocation event is desired. The window shows that Microphone audio recording recognition 49 was selected as another event for CWS invocation. Although a microphone is used in this example, any means of establishing an audio event may be used. This includes copying audio signals from a computer memory, a compact disc, an Internet connection, an LP record, a wireless communication link, a wired communication link, and a magnetic tape. After the "Enter" key is depressed, the window 50 of FIG. 7 appears.

The builder is now requested to provide a name of the audio event for Microphone audio recording recognition. The name Mary'sTakeMeToHospital 60 is entered by the builder. With respect to the event duration request 63, the builder does not respond 66 and the compiler provides the default duration of "momentary". The builder is next queried about having the duration of the event Mary'sTakeMeToHospital as an output in the parameter (OptionalEventDurationList) 67. Because no builder reply was provided 68, it will not appear in the output of Invoke (default value). Had the builder provided a "Yes" response 68, a different window would have appeared to create the output for the output parameter for (OptionalEventDurationList) and the compiler would pose the query for a name substitution for (OptionalEventDurationList).

Figure 8:
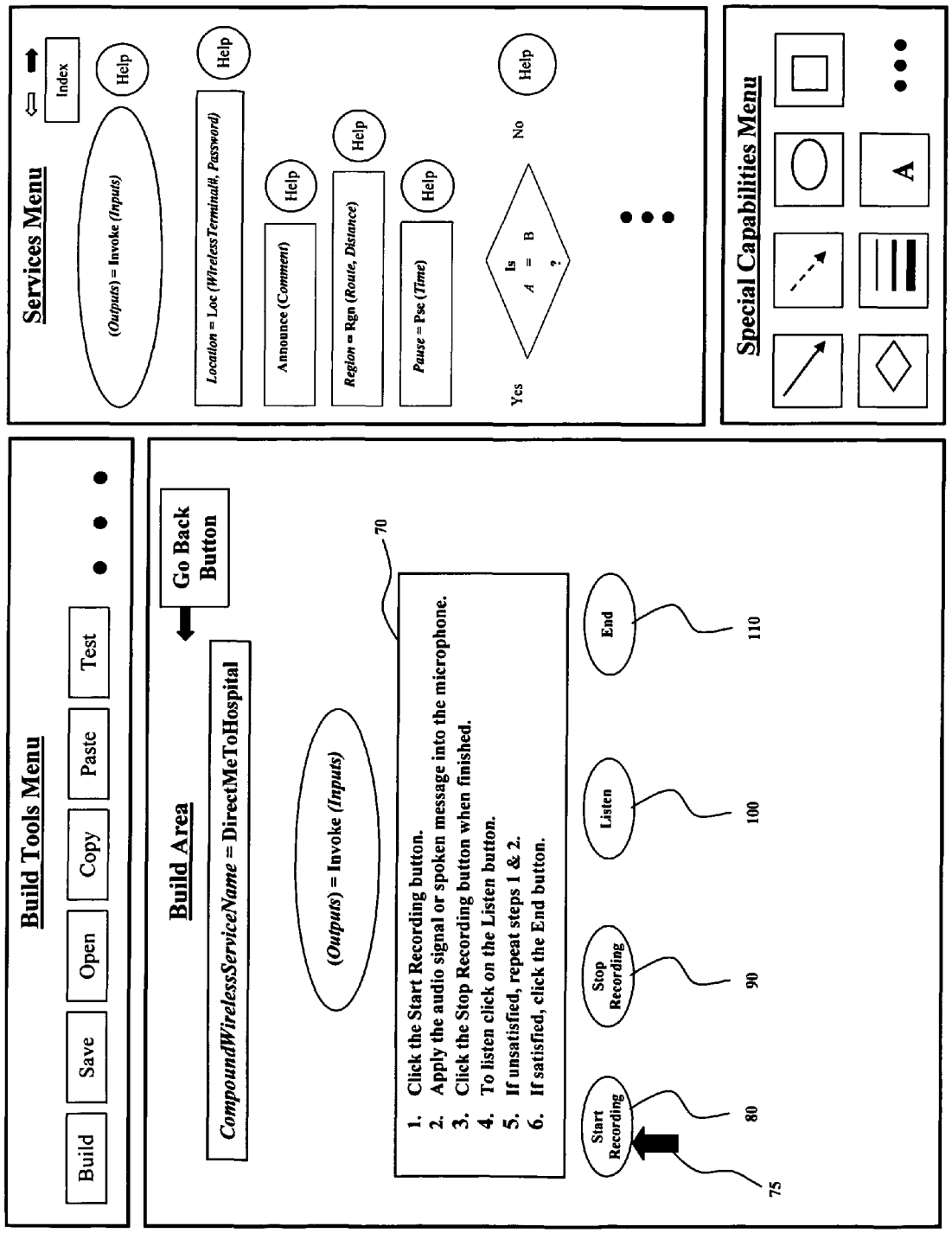
FIG. 8 shows how a value is recorded for an audio recognition invocation event to be used within a Boolean OptionalEventExpression parameter of the Invoke facility service.

After the "Enter" key 69 is depressed, the window 70 of FIG. 8 appears. This window is used to guide the audio event recording and thereby establish the audio print for audio recognition invocation. The recording starts when the cursor 75 is pointed at the "Start Recording" button 80 and clicked. Speaking into the microphone is the most likely source of the audio event; but a vocal recording is not a restriction. That is, any audio signal acquired from any audio source could be used for an audio event. The audio recording stops when the cursor is dragged to the "Stop Recording" button 90 and clicked. Pointing and clicking on the "Listen" button 100 will playback the recording. If the recording is unsatisfactory, the process of starting and stopping a recording may be repeated. A succeeding recording will overwrite a preceding recording. When the builder is satisfied with the recording, a point and click of the cursor on the "End" button 110 will end this session and FIG. 9 will appear with its windows.

Figure 9:
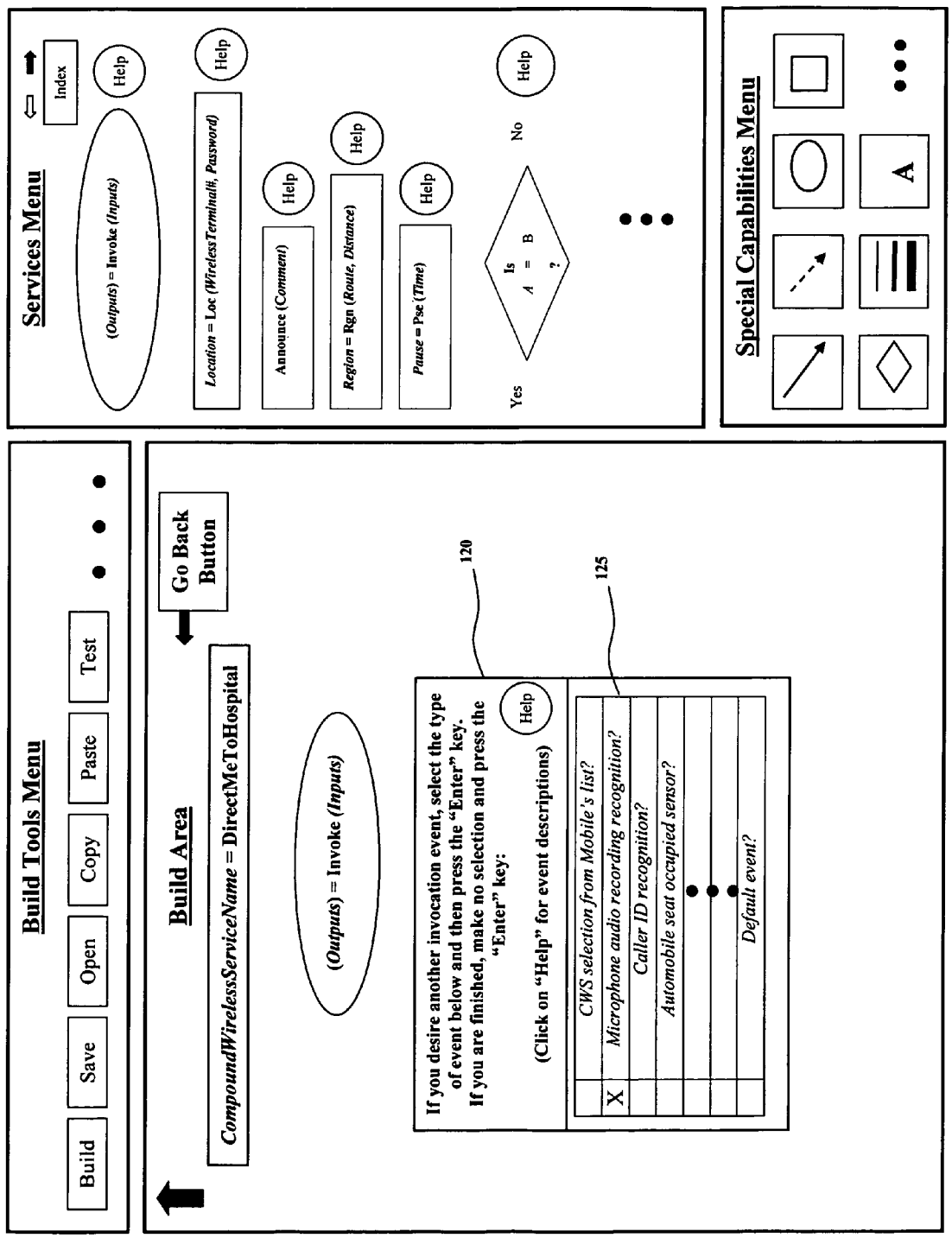
FIG. 9 shows how the third event type is selected for use as a Boolean OptionalEventExpression parameter of the Invoke facility service.

An instruction window 120 adding more events is shown in FIG. 9. The builder decides to use another Microphone audio recording recognition 125 event parameter. After the "Enter" key is depressed on the keyboard, the compiler again asks for an event name, as in FIG. 7 (not illustrated). It then runs another recording session, as was described for FIG. 8 (not illustrated). For this example, assume that the event of the second recording session is named John'sTakeMeToHospital. That is, the voice of a person named John was recorded. Following the second recording session, the compiler asks if another event parameter is desired as in FIG. 9. If no event is selected and the "Enter" key is depressed, the windows in FIG. 9 will be replaced by the windows of FIG. 10.

Figure 10:
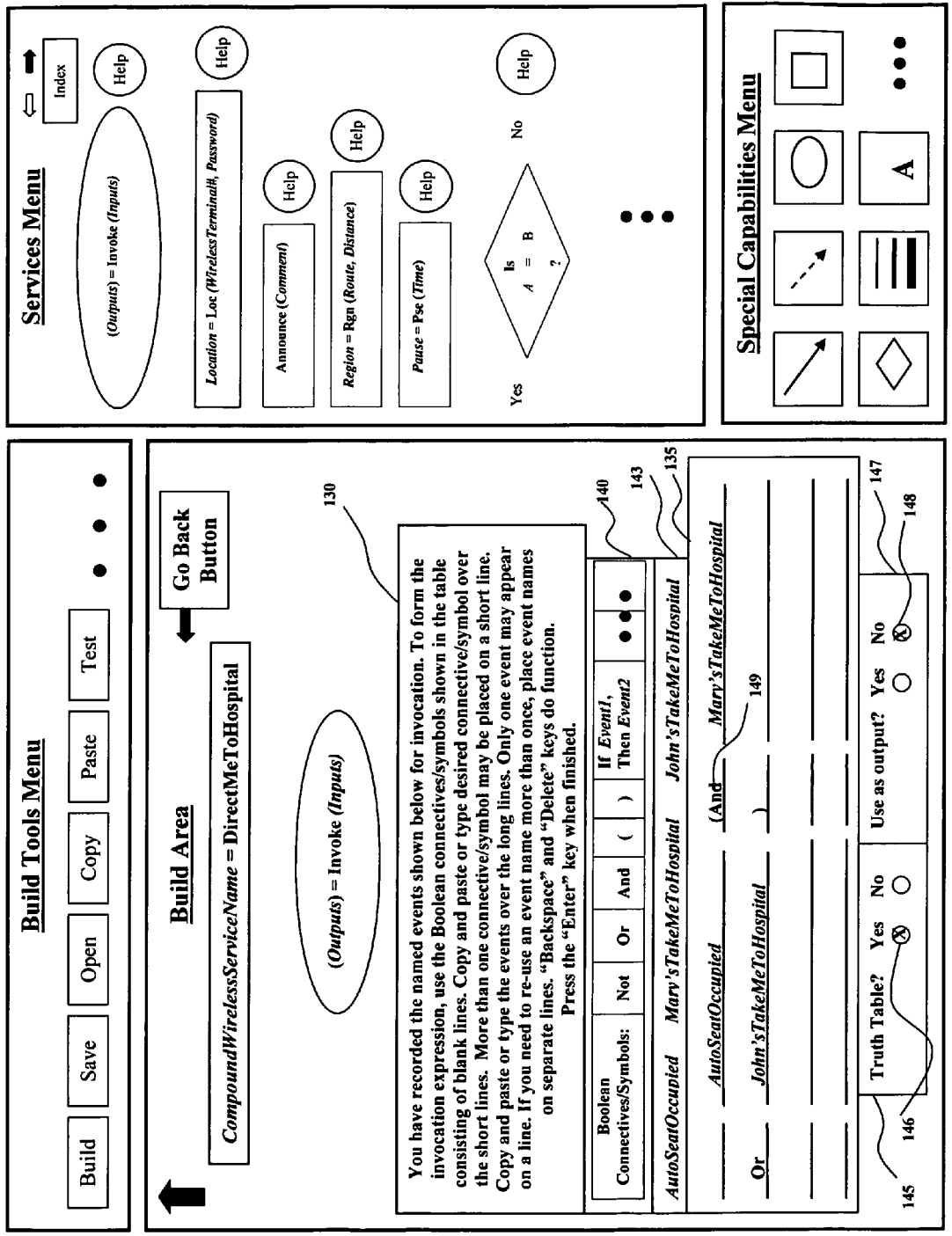
FIG. 10 shows how the Boolean OptionalEventExpression parameter of the Invoke facility service is formed.

The formation of an invocation Boolean expression is illustrated in FIG. 10. A window 130 in FIG. 10 indicates that the Boolean expression will be written into a table 135, initially consisting of blank lines. The instruction window 130 also requests the typing/copying of Boolean connectives and symbols 140 onto short blank lines of the Boolean expression table 135. The connective (or operation) Not 140 is used to negate the occurrence of an event. That is, {Not Eventu} has a "True" evaluation when Eventu has not occurred. The connective Or performs a inclusive disjunction. That is, the expression {Eventv Or Eventw} evaluates as "True" whenever Eventv is "True" (occurred) or Eventw is "True" or both events are "True". The connective And performs a conjunction. That is, the expression {Eventx And Eventy} evaluates as "True" whenever both Eventx and Eventy are "True". The expression {If Event1, Then Event2} is "False", if and only if Event1 is "True" (has occurred) and Event2 is "False" (has not occurred).

The named invocation events 143 are to be typed/copied onto the long blank lines of the Boolean expression table 135. The builder's result is the Boolean expression:

{AutoSeatOccupied (And Mary'sTakeMeToHospital Or John'sTakeMeToHospital)} 143.

The builder is provided with an opportunity to see a truth table of the Boolean expression 145 and does so by pointing the cursor and clicking on the "Yes" circle 146. An opportunity is also provided to use the Boolean invocation expression as an output 147. The builder decided not to have it an Invoke output clicking on "No" 148. Had the builder provided a "Yes" response 148, a different window would have appeared to create the output for the output parameter for {OptionalEventExpression} and the compiler would pose the query for a name substitution for {OptionalEventExpression}.

Subsequently to depressing the keyboard "Enter" key, as indicated in the instructions 130, the compiler determines that the Boolean expression contained an error 149. Consequently, the windows of FIG. 11 appear.

Figure 11:
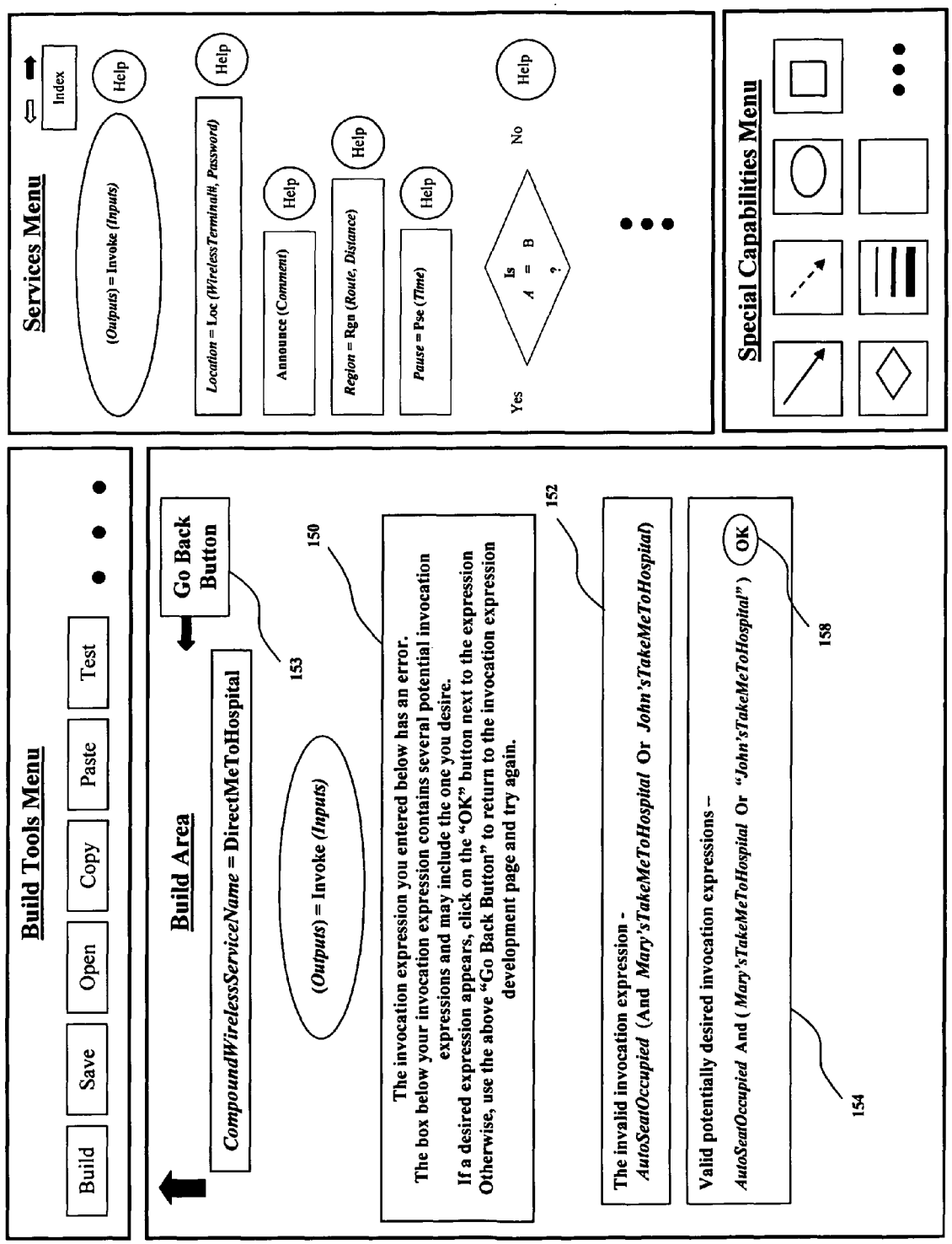
FIG. 11 shows how an erroneous Boolean OptionalEventExpression parameter of the Invoke facility service is corrected.

The instruction window 150 indicates a window below indicates the erroneous Boolean invocation expression 152. The instruction window 150 also describes the chokes of returning to the invocation expression development page, via the "Go Back Button" 153, and trying again or accepting one of the corrected invocation expressions 154. In FIG. 11, only one corrected invocation expression is shown. Other erroneous situations may result in several potentially desired corrected invocation expressions.

Figure 12:
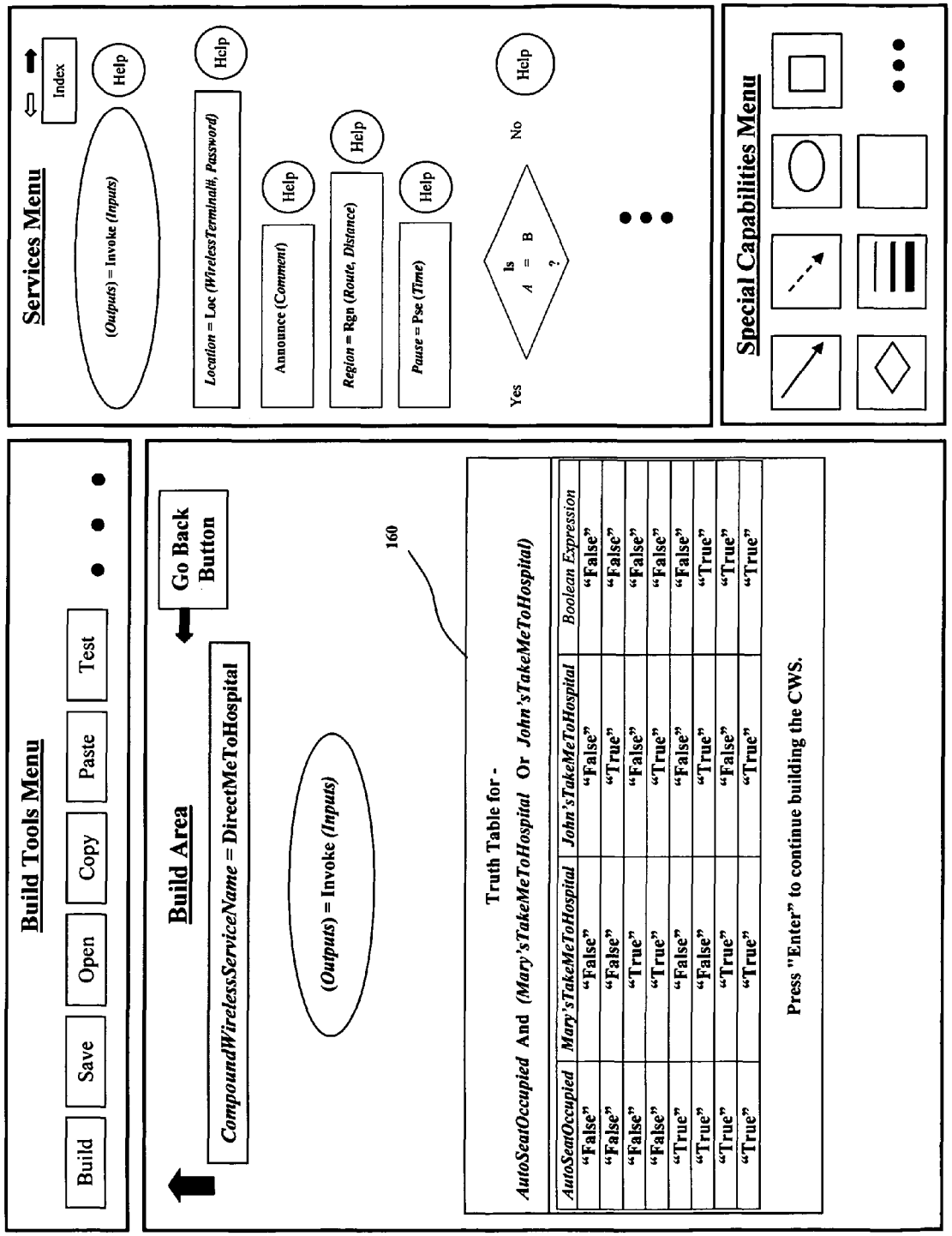
FIG. 12 shows the truth table for the built Boolean OptionalEventExpression parameter of the Invoke facility service.
Figure 13:
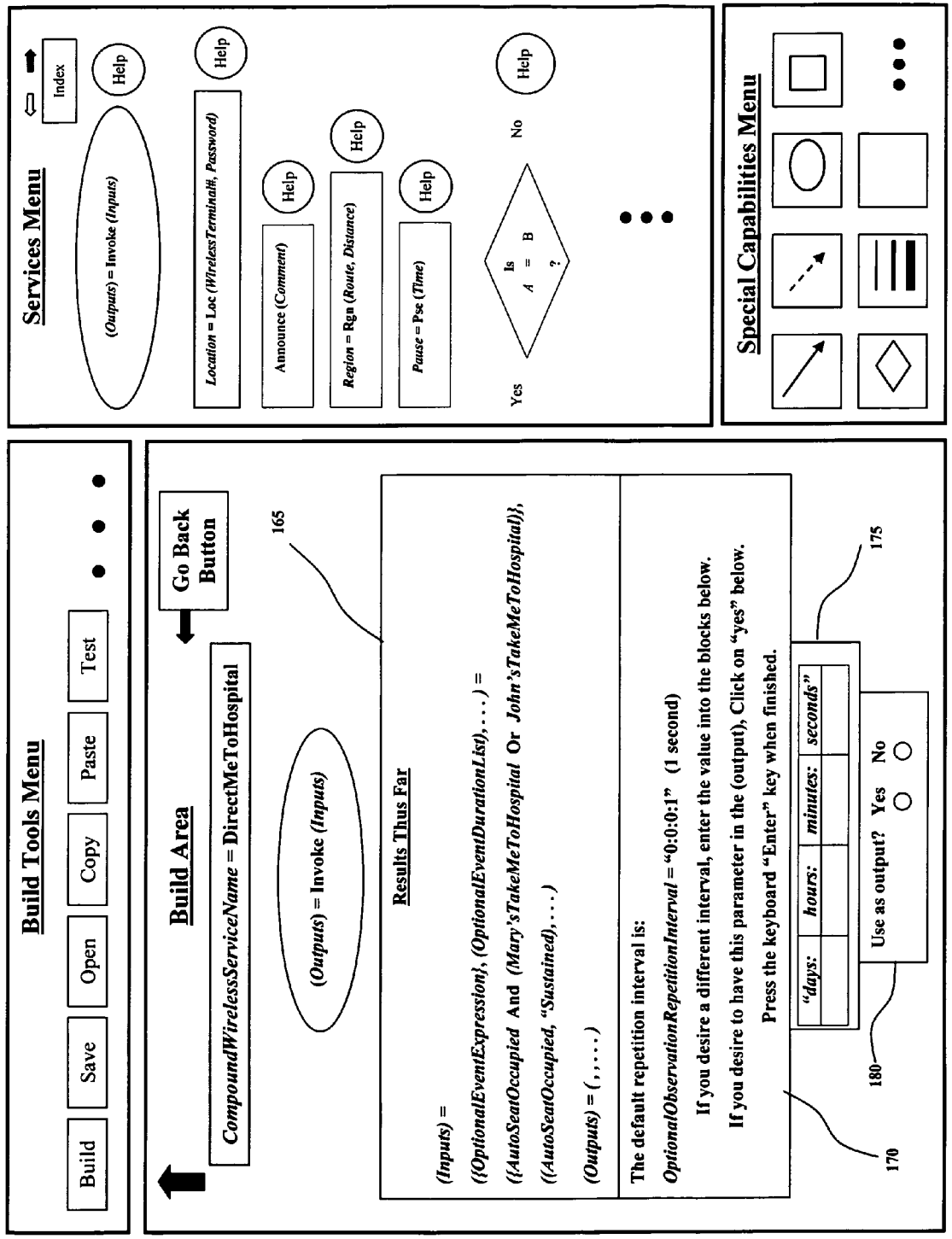
FIG. 13 shows how the value of the OptionalObservationRepetitionInterval parameter of the Invoke facility service is specified.

The builder accepted the compiler's corrected invocation expression by clicking on "OK" 158 and truth table 160 entries appear in FIG. 12. The table reveals that the automobile seat must be occupied before invocation can occur; only then will either Mary's recording or John's recording result in an invocation. After examining the truth table for consistency with the intended Boolean expression, the builder has the option to click on the "Go Back Button" to correct the expression or press the "Enter" key to proceed to FIG. 12. By pressing the "Enter" key, FIG. 13 appears and summarizes the building results thus far 165. The (Inputs) of Invoke contain the (OptionalEventExpression) and the non-default (builder prescribed) entries to the (OptionalEventDurationList) 165. No (Outputs) have been prescribed by the builder 165.

The compiler indicates a default value of 1 second for the event observation repetition interval 170. The builder is provided with an opportunity to change this value by making entries into another window 175. The opportunity to use OptionalObservationRepetitionInterval as part of the Invoke output 180 also exists. By not making an entry into this window 180, the builder decided not to do so. Had the builder provided a "Yes" response 180, a different window would have appeared to create the output for the output parameter for OptionalObservationRepetitionInterval and the compiler would pose the query for a name substitution for OptionalObservationRepetitionInterval.

Figure 14:
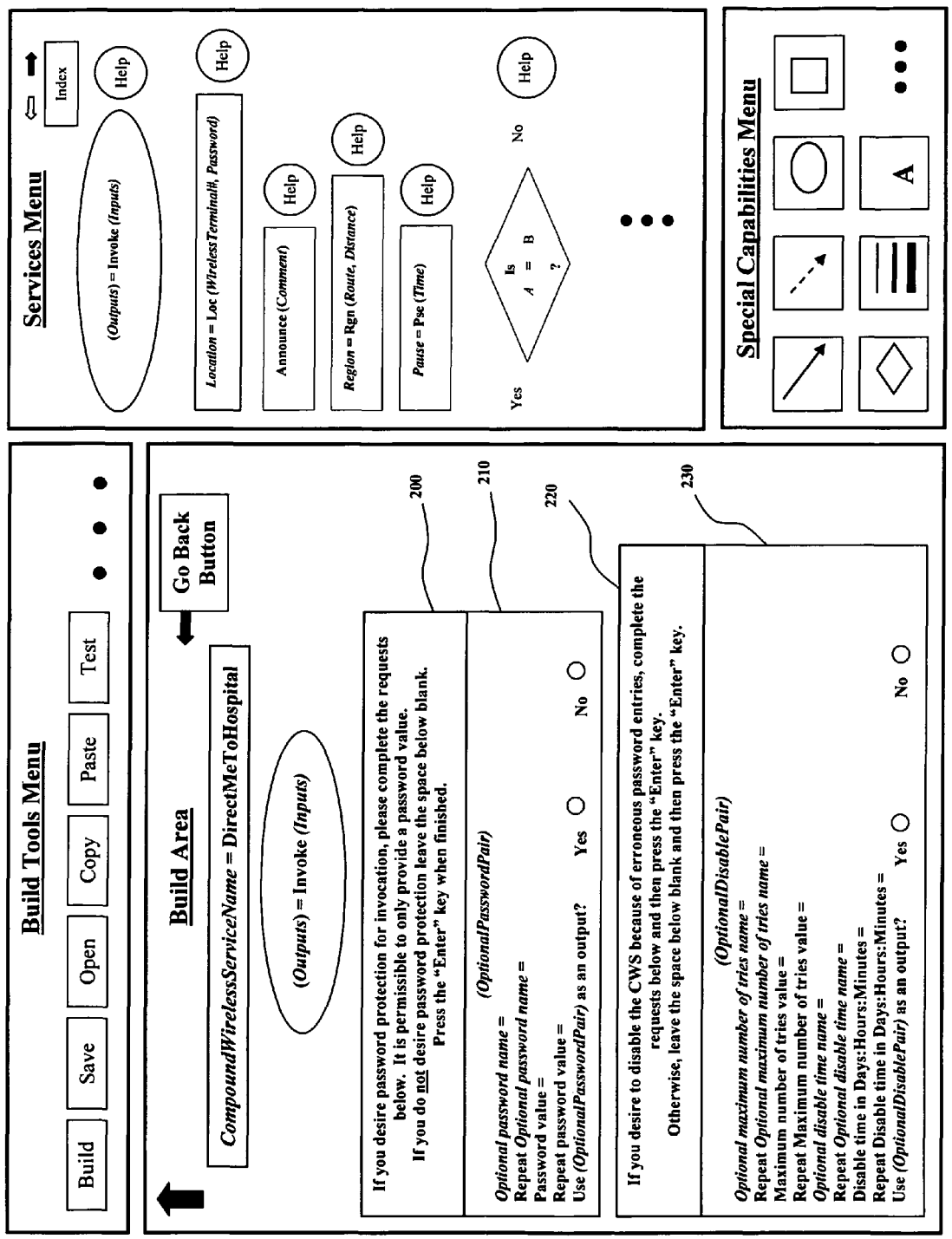
FIG. 14 shows how password protection of a compound wireless mobile communication service is achieved for the Invoke facility service.

No entries are made into the table for the OptionalObservationRepetitionInterval and after the builder presses the "enter" key 170, the windows of FIG. 14 appear.

A window FIG. 14 requests password protection information 200 and indicates the option of not using a password. The first request is for a password name and its value 210 (the parameter (OptionalPasswordPair)). If the password protection is desired and the password is never to change, the builder may leave the name blank and only provide a value. If a password value is provided without a name, a null entry is placed in the pair member dedicated for a name and the password cannot be changed without re-compiling the CWS. An option is also provide to include the (OptionalPasswordPair) parameter in the Invoke output 210.

Another window 220 is used to establish limits on the number of failed password attempts, if desired. Entries are made to establish the maximum number of failed attempts and CWS disabling duration (the parameter (OptionalDisableQuadruple)), if the number of failed attempts is exceeded 230. Again, the names for values are optional, as is the decision to use this feature. If values are provided without names, null entries are placed in the pair members dedicated for names and the values cannot be changed without re-compiling the CWS. An option is also provide to include the (OptionalDisableQuadruple) parameter in the Invoke output 230. Because all entries are left blank, the compiler will conclude that the builder has decided not to use password protection, after the "Enter" key has been pressed.

At this point of the build process, the parameter graphical aspects for {OptionalEventExpression}, (OptionalEventDurationList), OptionalObservationRepetitionInterval, (OptionalPasswordPair) and (OptionalDisableQuadruple) have been described. The following parameter graphical aspects have not been described:

1. OptionalEnablingSwitch
2. (OptionalInitialConditionsAssignmentList)
3. (OptionalLinkedCWSList)
4. (OptionalLinkedCWSPasswords)
5. (OptionalLinkedCWSData)
6. (OptionalNotifications)

Dialog between the builder and the compiler, for the remaining 6 Invoke parameters, resemble those for which dialog was previously described. Hence, only dialog summaries will be now provided. For the parameter OptionalEnablingSwitch, the compiler will provide the option of its deployment by means of pointing and clicking on a "Yes" or "No" displayed button. The parameter will not be deployed, should the keyboard "Enter" key be depressed without selecting one of the two buttons. However, some wireless service providers may oblige the deployment of this parameter. In such cases, the compiler will indicate the service button be selected and the wireless service provider's override and the "Yes" button will be checked. Non-deployment of this parameter is assumed in the graphical example.

For the parameter (OptionalInitialConditionsAssignmentList), the compiler will provide a table having two columns for entering pairs of data. A builder will enter the name of a constant or the name of a variable as the first member of a pair and a value of the data type, appropriate to named first member parameter named in the pair. This process is repeated for each parameter that is to be initialized when the CWS is invoked. This process' conclusion is indicated to the compiler when the builder depresses the "Enter" key on the keyboard. If no parameter name is entered into the table, and the Enter" key be depressed, this parameter will not be deployed. Non-deployment of this parameter is assumed in the graphical example.

For the parameter (OptionalLinkedCWSList), the compiler will provide a table having two columns for entering pairs of data. A builder will enter the name of a CWS to which a link is desired into a row of the first column. The CWS' address is entered into the second column of the row. This process is repeated for each CWS to be linked. This process' conclusion is indicated to the compiler when the builder depresses the "Enter" key on the keyboard. If no linking CWS name is entered into the table, and the Enter" key be depressed, this parameter will not be deployed. Non-deployment of this parameter is assumed in the graphical example.

For the parameter (OptionalLinkedCWSPasswords), the compiler will provide a table having two columns for entering pairs of data. A builder will enter the name of a CWS to which a link is desired into a row of the first column. The CWS' password is entered into the second column of the row. This process is repeated for each CWS to be linked. This process' conclusion is indicated to the compiler when the builder depresses the "Enter" key on the keyboard. If no linking CWS name is entered into the table, and the Enter" key be depressed, this parameter will not be deployed. Non-deployment of this parameter is assumed in the graphical example.

For the parameter (OptionalLinkedCWSData), the compiler will provide a table, having an extendable number of columns, for entering parameter data. The quantity of columns begins with three. A builder will enter the name of a CWS to which a link is desired into a row of the first column. A named constant or variable name is entered into the second column of the row. The third column of the row requires that the builder enters a value having a data type commensurate with the parameter name. If an additional parameter's data is to be transferred from the linked CWS, the builder is allowed to extend the table by two additional columns. This process is repeated for each CWS to be linked. This process' conclusion is indicated to the compiler when the builder depresses the "Enter" key on the keyboard. If nothing is entered into the table, and the Enter" key be depressed, this parameter will not be deployed. Non-deployment of this parameter is assumed in the graphical example.

For the parameter (OptionalNotifications), the compiler will provide a table, having an extendable number of rows, for entering parameter data. Four columns exist for the quadruples consisting of: a) notification cause, b) type of address for notification recipient, c) address of notification recipient, d) explanation message. A table is included that lists recognizable "causes", which were identified earlier; e.g., successful invocation, excessive invalid password attempts, inability to link to a CWS, and a change of location of the wireless mobile terminal. A builder may copy/type a "cause" in the first location of a quadruple. The acceptable address type entries were also cited earlier. Some examples are a telephone number, an Ethernet address, and an e-mail address. The explanation message can take several forms; e.g., a text message, a special ringing signal, and an image. The builder concludes the process of making entries by depressing the "Enter" key on the keyboard. If nothing is entered into the table, and the Enter" key be depressed, this parameter will not be deployed. Non-deployment of this parameter is assumed in the graphical example.

Figure 15:
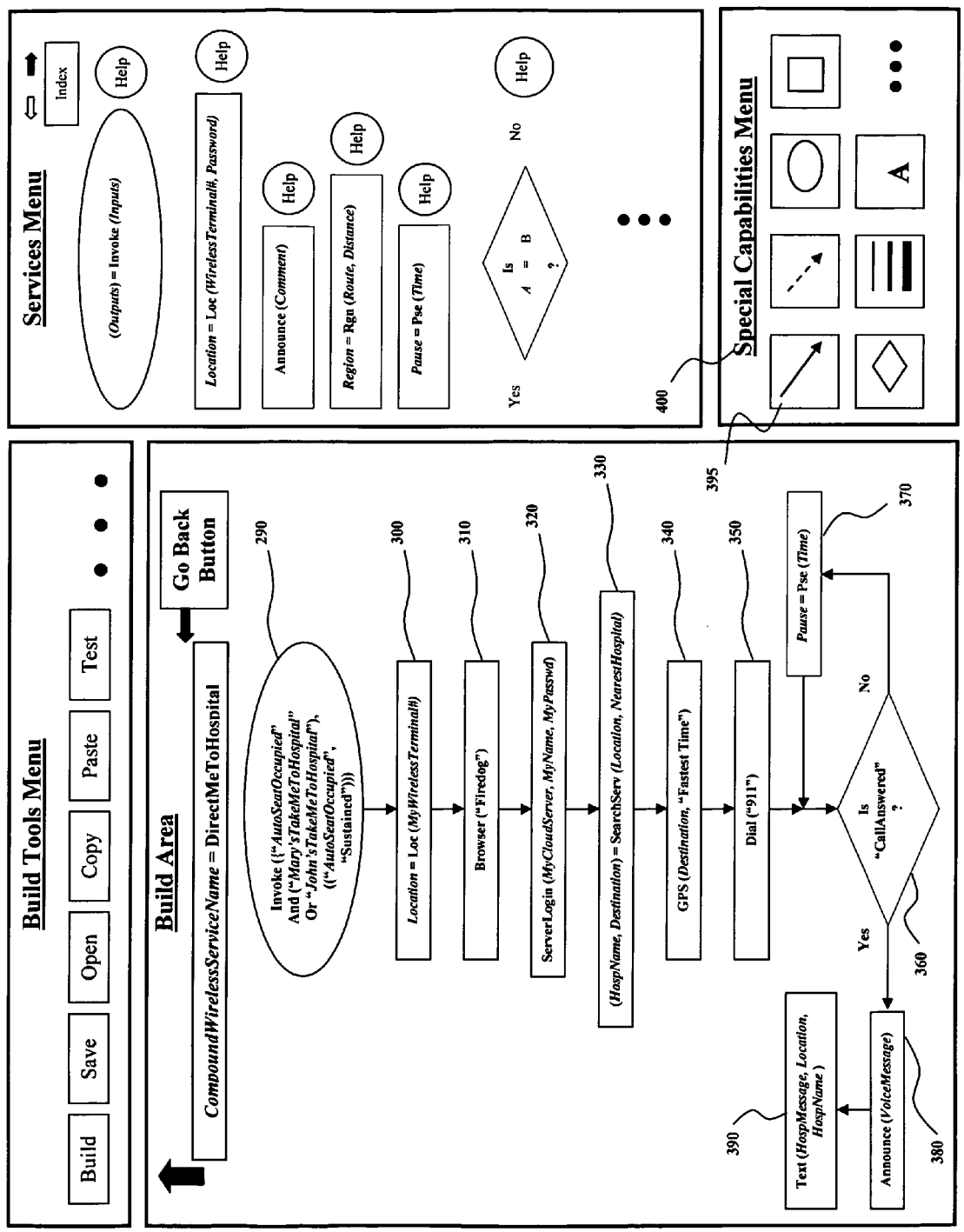
FIG. 15 shows the completed compound wireless mobile communication service named DirectMeToHospital.

The completed DirectMeToHospital CWS encompasses more than the Invoke CS. Other CSs are dragged from the "Services Menu" to graph the CWS. A sequence of compiler/builder interactions take place for each CS in a manner similar to that described for the CS Invoke. The completed CWS is shown in FIG. 15. The Invoke CS 290 is in its final form. By means of the builder's decisions, the Invoke output is devoid of parameters. Either of two pairs of events must take place before the CWS can be executed 290. One such pair of events consists of having the automobile seat occupied and having the voice recognition of the recording Mary'sTakeMeToHospital. The other pair of events for invocation consists of having the automobile seat occupied 1 and having the voice recognition of the recording John'sTakeMeToHospital. The pair ("AutoSeatOccupied", "Sustained") 290 belongs to the parameter (OptionalEventDurationList). It appears because the builder ascribed the "Sustained" value to the event.

After the Invoke CS completes its execution, the CS Loc 300 will begin executing. This CS is used to establish the location of the wireless mobile terminal identified by the input named MyWireleeTerminal#. The Loc CS output is identified by the variable named Location.

The next CS to execute is named Browser 310. This CS will connect the wireless mobile terminal to the Internet's World Wide Web via the browser identified by the constant value "Firedog". The Internet connection thereafter will link to a web address identified by the input named MyCloudServer contained within the CS named ServerLogin 320. This CS will provide the parameters MyName and MyPassword to the linked destination to avail communication between the wireless mobile terminal and the linked server. After linkage is consummated, the CS SearchServer 330 is executed using the input parameters Location and NearestHospital. The output of SearchServer is the parameter pair of HospName and Destination which provides the nearest hospital's name and its address in a textual type format. The preceding actions could have been achieved totally with Invoke. Other CS are used to achieve these actions to demonstrate alternate possibilities.

The wireless mobile terminal is capable of providing driving directions by means of the CS GPS 340. Directions will be provided according to the parameters Destination (to the nearest hospital) and "FastestTime" (quickest possible route). Because the wireless mobile terminal can do multi-tasking, it will Dial("911") 350 while providing GPS directions. After dialing, a CS 360 will test to determine if the call has been answered. If not, a Pause of a duration specified by the input variable Time will take place via the CS PSE 370 and the test for an answer 360 will be repeated.

When the 911 call is answered, a recorded voice message is announced to the call recipient via the CS Announce 380. This message would include the medical reason for the call, explain the necessity to go to a hospital emergency room, provide the automobile's license plate number, patient's name, patient's residence address, and other pertinent information to permit immediate hospital treatment. Referral to an ensuing text message 390 is also stated.

The text message is sent to the 911 destination via the CS Text 390. Its input parameter HospMessage would contain textual information such insurance company name and membership number, patient name and address, and possibly an ambulance request, etc. The patient's vehicle recent location (Location) and the name of the hospital destination (HospName) are also included in the text.

What I claim as my invention is:

1. A process to invoke the execution of a compound wireless mobile communication service residing on a Smartphone or cellular phone, also known as a Smartphone application or an app, by using a Boolean expression; such that the Boolean expression is contained within a software service that is uniquely assigned to an associated compound wireless mobile communication service, and the software service belongs to a family of app invocation services that exist in the Smartphone's software, wherein the Boolean expression is contained within a service termed Invoke facility service and the Invoke facility service was built as the first component service of the said compound wireless mobile communication service with variables representing events that are interconnected by the logical connectives of "and", "or", "not", "if X, then Y"; such that the events, including the aforementioned events designated as X and Y, are observable by the Smartphone or cellular telephone, and each such event observed by the Smartphone or cellular telephone can assume a "True" value, meaning the event has occurred, or a "False" value, meaning the event has not occurred, such that when the Boolean expression has an evaluation of "True", then the associated compound wireless mobile communication service will commence its execution; wherein events, locally observed by the Smartphone or cellular telephone, are; a) sending an audio signal that matches an audio signal stored by the builder in the Smartphone or cellular telephone, b) sending an audio signal to an address that matches an address stored by the builder in the Smartphone or cellular telephone, c) sending a video signal that matches a video signal stored by the builder in the Smartphone or cellular telephone, d) sending a video signal to an address that matches an address stored by the builder within the Smartphone or cellular telephone, e) sending a text message that matches a text message stored by the builder in the Smartphone or cellular telephone, f) sending a text message to an address that matches an address stored by the builder in the Smartphone or cellular telephone, g) sending a photograph that matches a photograph stored by the builder in the Smartphone or cellular telephone, h) sending a photograph to an address that matches an address stored by the builder in the Smartphone or cellular telephone, i) sending an e-mail with a subject that matches a subject stored by the builder within the Smartphone or cellular telephone, j) sending an e-mail to an address that matches an address stored by the builder within the Smartphone or cellular telephone, k) sending an audio signal, l) sending a video signal, m) sending a text message, n) sending a photograph, o) sending an e-mail, p) connecting to an Internet address that matches an Internet address stored by the builder in the Smartphone or cellular telephone, q) disconnecting from an Internet address that matches an Internet address stored by the builder in the Smartphone or cellular telephone, r) dialing of a telephone number that matches a telephone number stored by the builder in the Smartphone or cellular telephone, s) dialing of a telephone number, t) taking a photograph, u) recording a video, v) a Smartphone or cellular telephone's physically entering a geographical location that matches a geographical location stored by the builder in the Smartphone or cellular telephone, w) a Smartphone or cellular telephone's physically leaving a geographical location that matches a geographical location stored by the builder in the Smartphone or cellular telephone.

2. The process of claim 1 further comprising events, not locally observed by the Smartphone or cellular telephone, that are; a) receiving an audio signal that matches an audio signal stored by the builder in the Smartphone or cellular telephone, b) receiving an audio signal from an address that matches an address stored by the builder in the Smartphone or cellular telephone, c) receiving a video signal that matches a video signal stored by the builder in the Smartphone or cellular telephone, d) receiving a video signal from an address that matches an address stored by the builder within the Smartphone or cellular telephone, e) receiving a text message that matches a text message stored by the builder in the Smartphone or cellular telephone, f) receiving a text message from an address that matches an address stored by the builder in the Smartphone or cellular telephone, g) receiving a photograph that matches a photograph stored by the builder in the Smartphone or cellular telephone, h) receiving a photograph from an address that matches an address stored by the builder in the Smartphone or cellular telephone, i) receiving an e-mail with a subject that matches a subject stored by the builder within the Smartphone or cellular telephone, j) receiving an e-mail from an address that matches an address stored by the builder within the Smartphone or cellular telephone, k) receiving an audio signal, l) receiving a video signal, m) receiving a text message, n) receiving a photograph, o) receiving an e-mail, p) a "caller ID" for an incoming voice call that matches a "caller ID" stored by the builder within the Smartphone or cellular telephone, q) a "caller ID" for an incoming text message that matches a "caller ID" stored by the builder within the Smartphone or cellular telephone, r) a "caller ID" for an incoming photograph that matches a "caller ID" stored by the builder within the Smartphone or cellular telephone, s) a "caller ID" for an incoming video signal that matches one stored by the builder within the Smartphone or cellular telephone, t) an incoming signal from a remote Internet site that matches an incoming signal stored by the builder within the Smartphone or cellular telephone, u) an address of an incoming signal from a remote Internet site that matches an address of an incoming signal from a remote Internet site stored by the builder within—the Smartphone or cellular telephone, v) an incoming signal from a wireless service provider that matches an incoming signal from a wireless service provider stored by the builder within the Smartphone or cellular telephone, w) the date of an incoming e-mail that matches the date of an incoming e-mail stored by the builder within the Smartphone or cellular telephone, x) an incoming signal value from a transducer, having a communication link with the Smartphone or cellular telephone, that matches a signal value stored by the builder within the Smartphone or cellular telephone.

3. The method of claim 2, further comprising transducers that are; a) biological sensors that convert heart rate, systolic blood pressure, diastolic blood pressure, red blood cell oxygen level, blood glucose, body temperature, or electroencephalogram brain activity into a binary digital signal representation that is communicated to the Smartphone or cellular telephone, b) mechanical sensors that convert acceleration force, deceleration force, temperature in a solid, temperature in a liquid, temperature in a gas, pressure upon a solid, pressure upon a liquid, pressure upon a gas, or altitude into a binary digital signal representation that is communicated to the Smartphone or cellular telephone, c) chemical sensors that convert acidity, specific gravity, temperature of a solution, viscosity of a liquid, or molarity of a chemical solution into a binary digital signal representation that is communicated to the Smartphone or cellular telephone, d) electrical sensors that convert voltage, current, power, magnetic flux, resistance, reactance, impedance, capacitance, inductance, electrical signal bit rate, or electrical signal frequency into a binary digital signal representation that is communicated to the Smartphone or cellular telephone, e) any combination of the aforementioned four sensor types and constituent signals.

4. The process of claim 1, wherein further improvements provide a capability to remotely turn a specific app invocation service "off", meaning that the app invocation service and its associated compound wireless mobile communication service become disabled, and to remotely turn the app invocation service "on", meaning that the app invocation service's and its associated compound wireless mobile communication service become enabled.

5. The process of claim 1 with further improvements availing a repetition rate, prescribed by the invocation service builder, for observing whether events have occurred, wherein an event may be designated as "sustained", meaning observations of an event's occurrence is repeated according to the repetition rate and for each repeated observation may have a "True" value or a "False" value depending on the event's occurrence, or wherein the duration of an event may be designated as "momentary", meaning an event occurrence only needs to be observed once and thereafter retains a "True" value while the app invocation service and its associated Smartphone app execute.

6. The process of claim 1 with further improvements comprising the timing events that occur when; a) an existing time of day that matches a time of day specified in the Boolean expression, or b) an existing day of the week that matches the day of a week specified in the Boolean expression, or c) an existing day of the month that matches a day of the month specified in the Boolean expression, or d) an existing day of the year that matches a day of the year specified in the Boolean expression, or e) a combination of the aforementioned day types that match a combination of the aforementioned day types specified in the Boolean expression.

7. An interactive graphical compiler, constituting a body of software that resides in and is executed by a Smartphone or cellular telephone, to build the app invocation service, whereby the compiler's interactivity guides and simplifies the building the app invocation service as well as its associated app or compound wireless mobile communication service, abbreviated as CWS; wherein the guiding and simplification is achieved by: a) requesting builder responses to queries to establish whether an Invoke parameter is to be used and if so, requests the parameter's initial values; b) denying invalid builder responses to the queries; c) recommending valid alternatives to a builder after a builder's invalid response; d) providing salient "help" advice to a builder, relating to a compiler query; e) availing, to a builder, a description on the use and purpose of an app invocation service; such that the Invoke parameters and their components, for which compiler interactivity takes place, are: {OptionalEventExpression}—establishing event types, event values, and logical connectives between events to assist the creation of a Boolean expression; (OptionalEventDurationList)—establishing a list of pairs that designates whether each event is to be "sustained" or to be "momentary"; OptionalObservationRepetitionRate—establishing the rate at which the observations are to be made to determine whether events have occurred; (OptionalPasswordPair)—establishing a name and invocation password to protect from unauthorized execution of a CWS; (OptionalDisableQuadruple)—establishing a quadruple of parameters that indicate a name for the maximum permitted number of failed password attempts, the value of the maximum permitted number of failed password attempts, a name for the amount of time and the value of the amount of time (in days:hours:seconds) the CWS will be disabled if the number of failed attempts reaches the maximum; OptionalEnablingSwitch—establishing a parameter that will switch the CWS invocation state to either enabled or disabled; (OptionalInitialConditionsAssignmentList)—establishing a list of parameter pairs, each pair consisting of a CWS parameter name (named constants and variables) and the CWS parameter initial value when the CWS begins its execution; (OptionalLinkedCWSList)—establishing a list of parameter pairs, each pair consisting of a CWS name to which the Invoke associated CWS is to be linked and the potentially linked CWS address; (OptionalLinkedCWSPasswords)—establishing a list of parameter pairs, each pair consisting of a CWS name to which the Invoke associated CWS is to be linked and the potentially linked CWS password required for linking; (OptionalLinkedCWSData)—establishing a list of parameter pairs, each pair consisting of a parameter name (constant and variable) and a memory location into which a linked CWS will enter the value of the named parameter; (OptionalNotifications)—establishing a list of parameter quadruples to provide notification concerning the operation of the Invoke service, each quadruple consisting of the cause for a notification, the type of address of the notification recipient, the address of the notification recipient and a notification explanation message.

8. The method of claim 7, wherein further improvements provide for bypassing compiler interactivity for those builder selected parameters described in claim 7, such that no compiler dialog is conducted for building the selected parameters and the builder will be able to directly prescribe the properties for these parameters; with the intent to hasten building a CWS for those building steps that are well understood by the builder.

* * * * *